(12) United States Patent
Yu et al.

(10) Patent No.: US 11,228,450 B2
(45) Date of Patent: *Jan. 18, 2022

(54) METHOD AND APPARATUS FOR PERFORMING MULTI-PARTY SECURE COMPUTING BASED-ON ISSUING CERTIFICATE

(71) Applicant: Advanced New Technologies Co., Ltd., Grand Cayman (KY)

(72) Inventors: Chaofan Yu, Hangzhou (CN); Lei Wang, Hangzhou (CN); Aihui Zhou, Hangzhou (CN); Ning Zhang, Hangzhou (CN); Hongliang Tian, Hangzhou (CN); Junxian Xiao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,854

(22) Filed: Apr. 29, 2021

(65) Prior Publication Data

US 2021/0250183 A1    Aug. 12, 2021

Related U.S. Application Data

(63) Continuation of application No. 16/813,524, filed on Mar. 9, 2020, now Pat. No. 11,038,699, which is a
(Continued)

(30) Foreign Application Priority Data

Aug. 29, 2019   (CN) .................. 201910808822.5

(51) Int. Cl.
*H04L 9/32* (2006.01)
*H04L 29/06* (2006.01)
*H04L 9/08* (2006.01)

(52) U.S. Cl.
CPC .......... *H04L 9/3265* (2013.01); *H04L 9/0838* (2013.01); *H04L 9/3236* (2013.01);
(Continued)

(58) Field of Classification Search
CPC ... H04L 9/3265; H04L 63/166; H04L 9/0838; H04L 9/3236; H04L 63/0823;
(Continued)

(56) References Cited

U.S. PATENT DOCUMENTS 1,079,099 A      11/1913  Booker
8,707,030 B2 *   4/2014   Engberg .............. H04L 9/3265
                                                    713/157
(Continued)

FOREIGN PATENT DOCUMENTS

CN      104378374       2/2015
CN      107959656       4/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Abu S Sholeman
(74) *Attorney, Agent, or Firm* — Fish & Richardson P.C.

(57) ABSTRACT

Disclosed herein are methods, systems, and apparatus, including computer programs encoded on computer storage media, for providing certifications. One of the methods includes: receiving, from a computing unit, a certificate request, wherein the computing unit comprises at least one processor and a memory communicably coupled to the at least one processor, wherein the memory stores programming instructions associated with a computing task executable by the at least one processor, and wherein the certificate
(Continued)

request comprises a group of identifiers of a group of computing tasks and authentication information that comprises a hash value of the programming instructions; authenticating the computing unit based on the authentication information; in response to the computing unit is authenticated, determining, based on the hash value, that a computing task is included in the group of computing tasks; obtaining a certificate chain and a private key pre-generated for the group of identifiers; and sending a certificate report to the computing unit.

24 Claims, 11 Drawing Sheets

Related U.S. Application Data continuation of application No. PCT/CN2020/072112, filed on Jan. 15, 2020.

(52) U.S. Cl.
CPC ........ *H04L 9/3247* (2013.01); *H04L 63/0823* (2013.01); *H04L 63/166* (2013.01)

(58) Field of Classification Search
CPC ....... H04L 9/3247; H04L 9/321; H04L 9/006; H04L 9/0825; G06F 21/51
See application file for complete search history.

(56) References Cited

U.S. PATENT DOCUMENTS

| | | | |
|---|---|---|---|
| 10,766,884 B2 | 9/2020 | Chen et al. | |
| 2002/0007457 A1 | 1/2002 | Neff | |
| 2002/0188605 A1 | 12/2002 | Adva et al. | |
| 2004/0030794 A1 | 2/2004 | Hugly et al. | |
| 2004/0054899 A1 | 3/2004 | Balfanz et al. | |
| 2004/0103276 A1 | 5/2004 | Jing et al. | |
| 2004/0111607 A1* | 6/2004 | Yellepeddy | H04L 9/3268 713/155 |
| 2004/0111608 A1 | 6/2004 | de Castro et al. | |
| 2004/0162871 A1 | 8/2004 | Pabla et al. | |
| 2005/0177715 A1 | 8/2005 | Somin et al. | |
| 2005/0278534 A1 | 12/2005 | Nadalin et al. | |
| 2006/0036850 A1 | 2/2006 | Enokida | |
| 2007/0297607 A1 | 12/2007 | Ogura et al. | |
| 2010/0333080 A1 | 12/2010 | Keys et al. | |
| 2011/0145150 A1 | 6/2011 | Onischuk | |
| 2012/0124369 A1 | 5/2012 | Amenedo et al. | |
| 2013/0007442 A1 | 1/2013 | Mao et al. | |
| 2013/0318353 A1* | 11/2013 | Skarda | H04L 9/3263 713/175 |
| 2014/0109063 A1* | 4/2014 | Schissel | G06F 11/0712 717/127 |
| 2014/0165147 A1 | 6/2014 | Hershberg et al. | |
| 2015/0264040 A1 | 9/2015 | Schneider | |
| 2018/0227293 A1 | 8/2018 | Uhr et al. | |
| 2018/0294977 A1 | 10/2018 | Uhr et al. | |
| 2019/0034459 A1 | 1/2019 | Qiu | |
| 2019/0065406 A1 | 2/2019 | Steiner et al. | |
| 2020/0204346 A1 | 6/2020 | Trevethan | |
| 2020/0358764 A1 | 11/2020 | Uy et al. | |
| 2021/0067347 A1 | 3/2021 | Yu et al. | |

FOREIGN PATENT DOCUMENTS

| | | |
|---|---|---|
| CN | 108282466 | 7/2018 |
| CN | 109074449 | 12/2018 |
| CN | 109861980 | 6/2019 |
| CN | 109873801 | 6/2019 |
| CN | 110011988 | 7/2019 |
| CN | 110034925 | 7/2019 |
| CN | 110120869 | 8/2019 |
| CN | 108881252 | 11/2019 |
| CN | 110535628 | 12/2019 |
| CN | 110677240 | 1/2020 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/072112, dated Jun. 2, 2020, 16 pages (with machine translation).

* cited by examiner

METHOD AND APPARATUS FOR PERFORMING MULTI-PARTY SECURE COMPUTING BASED-ON ISSUING CERTIFICATE

CROSS-REFERENCE TO RELATED APPLICATIONS

This application is a continuation of U.S. application Ser. No. 16/813,524, filed Mar. 9, 2020, which is a continuation of PCT Application No. PCT/CN2020/072112, filed on Jan. 15, 2020, which claims priority to Chinese Patent Application No. 201910808822.5, filed on Aug. 29, 2019, and each application is hereby incorporated by reference in its entirety.

TECHNICAL FIELD

One or more implementations of the present specification relate to the field of distributed computing and secure computing, and in particular, to methods and apparatuses for multi-party secure computing.

BACKGROUND

To ensure computing and data transmission security, a trusted computing unit in a trusted execution environment (TEE) is often used to perform trusted computing and data processing. The trusted computing unit can ensure that code in the trusted computing unit is executed securely, and secrets such as internal running memory cannot be obtained by an external operating system or driver. For example, the trusted computing unit can be used to run program code and execute a computing task, so as to ensure execution security of the program code and isolation from outside of the TEE.

For security requirements of the TEE, before the trusted computing unit communicates with another party, such as a user terminal or another trusted computing unit, a common encryption key is usually negotiated first, and no one else can crack the key except the two communicating parties. Data sending between the two parties is encrypted by using the negotiated key. As such, the trusted computing unit establishes a trusted channel with another party, and can securely transmit secure data through the trusted channel.

In many cases, multi-party secure computing needs to be performed based on multiple trusted computing units. For example, some distributed tasks need to be jointly performed by executing multiple computing tasks in multiple trusted computing units, for example, tasks 1, 2, and 3 need to be jointly performed. In this case, the user terminal may need to communicate with the multiple trusted computing units that run the multiple computing tasks to obtain computing services. The multiple trusted computing units also need to communicate with each other to perform the computing tasks. Therefore, for the security requirements, a trusted channel needs to be established between the user terminal and the trusted computing unit, and between the multiple trusted computing units. If key negotiation is separately performed to separately establish trusted channels, when the number of trusted computing units becomes very large, the communication process of multi-party computing becomes complex and cumbersome with high costs.

Therefore, an improved solution is desired to facilitate multiple participants to perform multi-party secure computing to provide corresponding computing services.

SUMMARY

One or more implementations of the present specification describe methods and apparatuses for multi-party secure computing. A corresponding certificate in a certificate chain is distributed to each trusted computing unit that runs each computing task in a task group and a user terminal that requests a computing service of the task group, so as to ensure secure multi-party communication and computing between the user terminal and each trusted computing unit.

According to a first aspect, a method for obtaining a certificate to perform multi-party secure computing is provided and is executed by a first computing unit running a first computing task, where the first computing task is preconfigured to belong to a first task group, and the first task group further includes at least one other computing task; the method includes: sending a first certificate request to a trusted certificate generator, where the first certificate request includes a first group identifier of the first task group and first authentication information, and the first authentication information is used to perform trusted authentication on the first computing unit and includes a first code hash of the first computing task; receiving a first certificate report from the trusted certificate generator, where the first certificate report includes a first certificate chain and a first private key that are generated for the first group identifier, the first certificate chain includes a first root certificate and a corresponding first public key certificate, and the first public key certificate matches the first private key to form a first certificate pair; and serving, by the first computing unit, as a Transport Layer Security (TLS) server that provides a computing service of the first computing task, and setting the first certificate pair as a certificate pair of the TLS server, and serving, by the first computing unit, as a TLS client connected to the at least one other computing task, and setting the first root certificate as a trusted root certificate of the TLS client.

In some implementations of the first aspect, the first computing unit is implemented as a trusted enclave.

According to some implementations of the first aspect, before the sending a first certificate request to a trusted certificate generator, the method further includes: generating a unit report file of the first computing unit, where the unit report file includes the first code hash and signature information of the first computing unit; sending the unit report file to a third-party authentication authority to obtain an authentication result file, where the authentication result file includes signature information of the third-party authentication authority; and including the authentication result file as the first authentication information into the first certificate request.

According to some other implementations of the first aspect, before the sending a first certificate request to a trusted certificate generator, the method further includes: generating a unit report file of the first computing unit, where the unit report file includes the first code hash and signature information of the first computing unit; and including the unit report file as the first authentication information into the first certificate request.

According to some implementations, before the sending a first certificate request to a trusted certificate generator, the first computing unit performs key negotiation with the trusted certificate generator to establish a trusted channel, where the trusted channel is used to send the first certificate request and receive the first certificate report.

According to a second aspect, a method for distributing a certificate to a computing unit is provided and is executed by a trusted certificate generator, where the method includes: receiving a first certificate request from a first computing unit running a first computing task, where the first certificate request includes a first group identifier of a first task group and first authentication information, and the first authentication information is used to authenticate the first computing unit and includes a first code hash of the first computing task; performing authentication on the first computing unit based on the first authentication information; when the authentication succeeds, determining, based on the first code hash, whether the first computing task belongs to the first task group; when it is determined that the first computing task belongs to the first task group, obtaining a first certificate chain and a first private key that are pre-generated for the first group identifier, where the first certificate chain includes a first root certificate and a corresponding first public key certificate, and the first public key certificate matches the first private key to form a first certificate pair; and sending a first certificate report to the first computing unit, where the first certificate report includes the first root certificate and the first certificate pair, so serving as both a TLS server that provides a computing service and a TLS client connected to another computing task, the first computing unit sets the first certificate pair as a certificate pair of the TLS server, and sets the first root certificate as a trusted root certificate of the TLS client.

According to some implementations of the second aspect, the first authentication information is an authentication result file authenticated by a third-party authentication authority, and the authentication result file includes signature information of the third-party authentication authority; and in this case, performing authentication on the first computing unit includes: verifying the signature information, and when the verification succeeds, determining that the first computing unit is authenticated.

According to some other implementations of the second aspect, the first authentication information is a unit report file generated by the first computing unit, and the unit report file includes the first code hash and signature information of the first computing unit; and in this case, performing authentication on the first computing unit includes: sending the unit report file to a third-party authentication authority to obtain an authentication result file, where the authentication result file includes signature information of the third-party authentication authority; and verifying the signature information, and when the verification succeeds, determining that the first computing unit is authenticated.

According to some implementations of the second aspect, before the receiving a first certificate request from a first computing unit running a first computing task, the trusted certificate manager receives a first generation command from a configuration manager, where the first generation command includes the first group identifier and a first hash list corresponding to the first group identifier, and the first hash list includes code hashes of all computing tasks belonging to the first task group; and generates the first certificate chain and the first private key for the first group identifier.

According to some implementations of the second aspect, whether the first computing task belongs to the first task group is determined by: obtaining a pre-configured first hash list corresponding to the first group identifier, where the first hash list includes code hashes of all computing tasks belonging to the first task group; and determining whether the first code hash is in the first hash list, and if yes, determining that the first computing task belongs to the first task group.

According to some implementations of the second aspect, the first public key certificate includes a first public key generated for the first group identifier, and first signature information signed by the trusted certificate generator, the first public key and the first private key constitute a key pair, the first root certificate includes a second public key generated for the first group identifier and second signature information self-signed by the trusted certificate generator, and the second public key is used to verify the first signature information and the second signature information.

According to some other implementations of the second aspect, the first public key certificate includes a first public key generated for the first group identifier, and first signature information signed by the trusted certificate generator, the first public key and the first private key constitute a key pair, the first root certificate includes the first public key and second signature information self-signed by the trusted certificate generator, and the first public key is used to verify the first signature information and the second signature information.

According to some implementations of the second aspect, before the receiving a first certificate request from a first computing unit running a first computing task, a trusted certificate generator performs key negotiation with the first computing unit to establish a trusted channel, where the trusted channel is used to receive the first certificate request and send the first certificate report.

According to a third aspect, a method for obtaining a certificate to perform multi-party secure computing is provided and is executed by a user terminal, where the method includes: sending a second certificate request to a trusted certificate generator, where the second certificate request includes a first group identifier of a first task group that expects to be connected; receiving a second certificate report from the trusted certificate generator, where the second certificate report includes at least a first root certificate in a first certificate chain generated for the first group identifier, the first certificate chain further includes a first public key certificate corresponding to the first root certificate, and the first public key certificate and a matched first private key form a first certificate pair that is pre-distributed to at least one computing unit that is authenticated and that runs each computing task in the first task group; and serving, by the user terminal, as a TLS client, and setting the first root certificate as a trusted root certificate of the TLS client, so as to communicate with the at least one computing unit that has the first certificate pair and that functions as a TLS server.

According to some implementations of the third aspect, before the sending a second certificate request to a trusted certificate generator, the method further includes: obtaining second authentication information of the trusted certificate generator; and performing authentication on the trusted certificate generator based on the second authentication information.

According to some implementations, the second authentication information is a second authentication result file authenticated by a third-party authentication authority, and the authentication result file includes signature information of the third-party authentication authority; and performing authentication on the trusted certificate generator based on the second authentication information includes: verifying the signature information, and when the verification succeeds, determining that the trusted certificate generator is authenticated.

According to some other implementations, the second authentication information is a report file generated by the trusted certificate generator, and the report file includes a code hash and signature information of the trusted certificate generator; and performing authentication on the trusted certificate generator based on the second authentication information includes: sending the report file to a third-party authentication authority to obtain an authentication result file, where the authentication result file includes signature information of the third-party authentication authority; and verifying the signature information, and when the verification succeeds, determining that the trusted certificate generator is authenticated.

According to some implementations of the third aspect, the second certificate report further includes a first hash list corresponding to the first group identifier, and the first hash list includes code hashes of all computing tasks belonging to the first task group; and before the setting the first root certificate as a trusted root certificate of the TLS client, the method further includes: determining whether the first hash list meets expectations.

According to some implementations of third aspect, after the setting the first root certificate as a trusted root certificate of the TLS client, the method further includes: making a TLS handshake with the at least one computing unit to establish a TLS trusted channel; and obtaining a computing service of the first task group from the at least one computing unit by using the TLS trusted channel.

According to some implementations of the third aspect, the second certificate report further includes the first public key certificate, and the method further includes: encrypting user data of the user terminal by using the first public key certificate, and storing encrypted user data in a data platform, so the at least one computing unit decrypts and obtains the user data by using the first certificate pair.

According to a fourth aspect, a method for distributing a certificate to a user terminal is provided and is executed by a trusted certificate generator, where the method includes: receiving a second certificate request sent by a user terminal, where the second certificate request includes a first group identifier of a first task group that the user terminal expects to connect; obtaining a first certificate chain and a first private key that are pre-generated for the first group identifier, where the first certificate chain includes a first root certificate and a first public key certificate corresponding to the first root certificate, the first public key certificate matches the first private key to form a first certificate pair, and at least the first certificate pair is pre-distributed to at least one computing unit that is authenticated and that runs each computing task in the first task group; and sending a second certificate report to the user terminal, where the second certificate report includes at least the first root certificate, so the user terminal uses itself as a TLS client and uses the first root certificate as a trusted root certificate of the TLS client, so as to communicate with the at least one computing unit that has the first certificate pair and that functions as a TLS server.

According to some implementations of the fourth aspect, before the receiving a second certificate request sent by a user terminal, the method further includes: providing second authentication information to the user terminal in response to an authentication request from the user terminal, so the user terminal performs authentication.

According to some implementations, providing second authentication information to the user terminal includes: generating a report file, where the report file includes a code hash and signature information of the trusted certificate generator; sending the report file to a third-party authentication authority to obtain an authentication result file, where the authentication result file includes signature information of the third-party authentication authority; and providing the authentication result file as the second authentication information to the user terminal.

According to some other implementations, providing second authentication information to the user terminal includes: generating a report file, where the report file includes a code hash and signature information of the trusted certificate generator; and providing the report file as the second authentication information to the user terminal.

According to some implementations of the fourth aspect, the second certificate report further includes a first hash list corresponding to the first group identifier, and the first hash list includes code hashes of all computing tasks belonging to the first task group.

According to some implementations of the fourth aspect, the second certificate report further includes the first public key certificate, so the user terminal encrypts user data by using the first public key certificate.

According to a fifth aspect, a method for performing multi-party secure computing by using a digital certificate is provided and is executed by a first computing unit running a first computing task, where: the first computing task is pre-configured to belong to a first task group, and the first task group further includes a second computing task run by a second computing unit; a first certificate pair and a first root certificate generated for the first task group are pre-distributed to the first computing unit, the first certificate pair includes a first public key certificate and a matched first private key, and the first public key certificate and the first root certificate form a first certificate chain; the first computing unit is configured as a first TLS server that provides a computing service of the first computing task, the first TLS server uses the first certificate pair as a certificate pair of the first TLS server, the first computing unit is further configured as a first TLS client at least connected to the second computing unit, and the first TLS client uses the first root certificate as a trusted root certificate of the first TLS client; and the method includes: establishing a first TLS trusted channel by using the first TLS server to make a TLS handshake with a user terminal that functions as a second TLS client, where the second TLS client uses the first root certificate as a trusted root certificate of the second TLS client; receiving first user data by using the first TLS trusted channel; performing first processing on the first user data to obtain first application data; establishing a second TLS trusted channel by using the first TLS client to make a TLS handshake with a second computing unit that functions as a second TLS server, where the second TLS server uses the first certificate pair as a certificate pair of the second TLS server; and transmitting the first application data to the second computing unit by using the second TLS trusted channel.

In some implementations of the fifth aspect, the method further includes: reading second user data from a data platform, where the second user data is generated by the user terminal through encryption by using the first public key certificate; and decrypting the second user data by using the first private key.

In some implementations of the fifth aspect, the method further includes: generating second application data; encrypting the second application data by using the first public key certificate to obtain second encrypted application data; and storing the second encrypted application data into a data platform, so the second computing unit decrypts and obtains the second application data by using the first certificate pair.

According to a sixth aspect, an apparatus for obtaining a certificate to perform multi-party secure computing is provided and deployed on a first computing unit running a first computing task, where the first computing task is preconfigured to belong to a first task group, and the first task group further includes at least one other computing task; the apparatus includes: a first certificate request module, configured to send a first certificate request to a trusted certificate generator, where the first certificate request includes a first group identifier of the first task group and first authentication information, and the first authentication information is used to perform trusted authentication on the first computing unit and includes a first code hash of the first computing task; a first report receiving module, configured to receive a first certificate report from the trusted certificate generator, where the first certificate report includes a first certificate chain and a first private key that are generated for the first group identifier, the first certificate chain includes a first root certificate and a corresponding first public key certificate, and the first public key certificate matches the first private key to form a first certificate pair; and a first setting module, configured to use the first computing unit as a TLS server that provides a computing service of the first computing task, and set the first certificate pair as a certificate pair of the TLS server, and use the first computing unit as a TLS client connected to the at least one other computing task, and set the first root certificate as a trusted root certificate of the TLS client.

According to a seventh aspect, an apparatus for distributing a certificate to a computing unit is provided and is deployed on a trusted certificate generator, where the apparatus includes: a first request receiving module, configured to receive a first certificate request from a first computing unit running a first computing task, where the first certificate request includes a first group identifier of a first task group and first authentication information, and the first authentication information is used to authenticate the first computing unit and includes a first code hash of the first computing task; a unit authentication module, configured to perform authentication on the first computing unit based on the first authentication information; a group determining module, configured to: when the authentication succeeds, determine, based on the first code hash, whether the first computing task belongs to the first task group; a certificate acquisition module, configured to: when it is determined that the first computing task belongs to the first task group, obtain a first certificate chain and a first private key that are pre-generated for the first group identifier, where the first certificate chain includes a first root certificate and a corresponding first public key certificate, and the first public key certificate matches the first private key to form a first certificate pair; and a first report sending module, configured to send a first certificate report to the first computing unit, where the first certificate report includes the first root certificate and the first certificate pair, so serving as both a TLS server that provides a computing service and a TLS client connected to another computing task, the first computing unit sets the first certificate pair as a certificate pair of the TLS server, and sets the first root certificate as a trusted root certificate of the TLS client.

According to an eighth aspect, an apparatus for obtaining a certificate to perform multi-party secure computing is provided and deployed on a user terminal, where the apparatus includes: a second request sending module, configured to send a second certificate request to a trusted certificate generator, where the second certificate request includes a first group identifier of a first task group that expects to be connected; a second report receiving module, configured to receive a second certificate report from the trusted certificate generator, where the second certificate report includes at least a first root certificate in a first certificate chain generated for the first group identifier, the first certificate chain further includes a first public key certificate corresponding to the first root certificate, and the first public key certificate and a matched first private key form a first certificate pair that is pre-distributed to at least one computing unit that is authenticated and that runs each computing task in the first task group; and a second setting module, configured to use the user terminal as a TLS client, and set the first root certificate as a trusted root certificate of the TLS client, so as to communicate with the at least one computing unit that has the first certificate pair and that functions as a TLS server.

According to a ninth aspect, an apparatus for distributing a certificate to a user terminal is provided and is deployed on a trusted certificate generator, where the apparatus includes: a second request receiving module, configured to receive a second certificate request sent by a user terminal, where the second certificate request includes a first group identifier of a first task group that the user terminal expects to connect; a certificate acquisition module, configured to obtain a first certificate chain and a first private key that are pre-generated for the first group identifier, where the first certificate chain includes a first root certificate and a first public key certificate corresponding to the first root certificate, the first public key certificate matches the first private key to form a first certificate pair, and at least the first certificate pair is pre-distributed to at least one computing unit that is authenticated and that runs each computing task in the first task group; and a second report sending module, configured to send a second certificate report to the user terminal, where the second certificate report includes at least the first root certificate, so the user terminal uses itself as a TLS client and uses the first root certificate as a trusted root certificate of the TLS client, so as to communicate with the at least one computing unit that has the first certificate pair and that functions as a TLS server.

According to a tenth aspect, an apparatus for performing multi-party secure computing by using a digital certificate is provided and is deployed on a first computing unit running a first computing task, where: the first computing task is pre-configured to belong to a first task group, and the first task group further includes a second computing task run by a second computing unit; a first certificate pair and a first root certificate generated for the first task group are pre-distributed to the first computing unit, the first certificate pair includes a first public key certificate and a matched first private key, and the first public key certificate and the first root certificate form a first certificate chain; the first computing unit is configured as a first TLS server that provides a computing service of the first computing task, the first TLS server uses the first certificate pair as a certificate pair of the first TLS server, the first computing unit is further configured as a first TLS client at least connected to the second computing unit, and the first TLS client uses the first root certificate as a trusted root certificate of the first TLS client; and the apparatus includes: a first handshake module, configured to establish a first TLS trusted channel by using the first TLS server to make a TLS handshake with a user terminal that functions as a second TLS client, where the second TLS client uses the first root certificate as a trusted root certificate of the second TLS client; a data receiving module, configured to receive first user data by using the first TLS trusted channel; a data processing module, configured to perform first processing on the first user data to obtain first application data; a second handshake module, configured to establish a second TLS trusted channel by using the first TLS client to make a TLS handshake with a second computing unit that functions as a second TLS server, where the second TLS server uses the first certificate pair as a certificate pair of the second TLS server; and a data sending module, configured to transmit the first application data to the second computing unit by using the second TLS trusted channel.

According to an eleventh aspect, a computer readable storage medium that stores a computer program is provided, and when the computer program is executed on a computer, the computer is caused to perform the methods according to the first aspect to the fifth aspect.

According to a twelfth aspect, a computing device is provided and includes a memory and a processor. Executable code is stored in the memory, and when executing the executable code, the processor implements the methods according to the first aspect to the fifth aspect.

According to the method and the apparatus provided in the implementations of the present specification, a certificate is generated and distributed by a trusted certificate generator, to implement secure authentication and verification, so multi-party secure communication and computing are performed between a user terminal and a trusted computing unit. Specifically, computing tasks are grouped in advance to form task groups. The trusted certificate generator distinguishes between different task groups by group identifier, and generates one certificate chain and one private key for one group identifier. The certificate chain includes a root certificate and a corresponding public key certificate, and the public key certificate matches the private key to form a certificate pair. Then, the trusted certificate generator distributes the root certificate and the certificate pair to each trusted computing unit that is authenticated and that runs each computing task corresponding to the group identifier. Therefore, multiple trusted computing units that run computing tasks in the same task group obtain the same certificate pair and root certificate. In addition, the trusted certificate generator distributes the root certificate to a user terminal that requests a computing service of the task group. Therefore, multi-party secure communication can be performed by using the TLS protocol between the user terminal having the root certificate and the trusted computing unit having the root certificate and the certificate pair.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Figure 1:
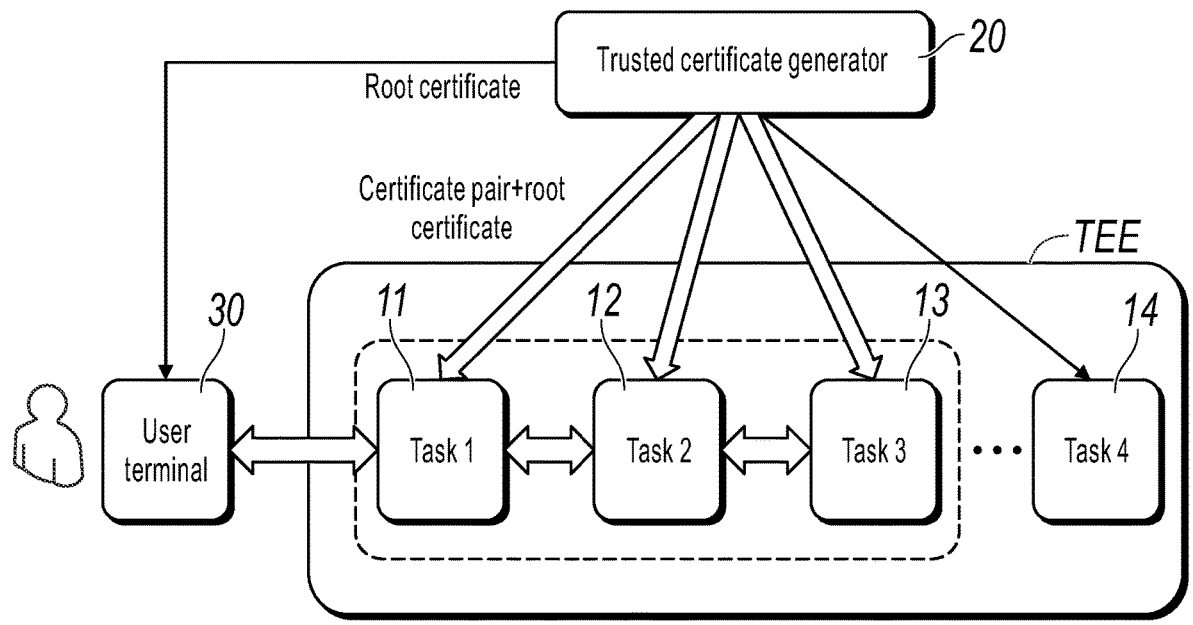
FIG. 1 is a schematic diagram illustrating an implementation scenario of some implementations disclosed in the present specification.

FIG. 1 is a schematic diagram illustrating an implementation scenario of some implementations disclosed in the present specification. As shown in the figure, a computing task can be executed by using a trusted computing unit in a TEE. The trusted computing unit can be a computing module or a computing device that has a certain isolation capability to ensure computing security, for example, a trusted computing enclave implemented by using technologies such as SGX or Trust Zone. For example, based on the SGX technology, by providing a series of CPU instruction codes, user codes are allowed to create a private memory area with high access rights to form a computing enclave. Other application programs such as an operating system (OS), a BIOS system, and a virtual machine system cannot access data in the enclave, so states and data of application programs in the enclave cannot be snooped or tampered with. Therefore, a computing task is executed by using, for example, a trusted computing unit in the enclave to ensure isolation between a task code and an external environment, ensuring secure running of a task program.

In the example of FIG. 1, each trusted computing unit (for example, each enclave) separately executes its own computing task, for example, trusted computing units 11, 12, 13, 14 separately execute different computing tasks: task 1, task 2, task 3, and task 4. It can be understood that this is merely an example. There can be other trusted computing units performing other tasks, or there can be multiple trusted computing units performing multiple copies of the same task.

In case of a distributed task, multiple trusted computing units running multiple computing tasks need to jointly perform multi-party computing. For example, assume that task 1, task 2, and task 3 need to jointly provide a set of computing services.

As described above, due to security requirements of the TEE, it is needed that a trusted channel be established between a user terminal and each trusted computing unit and between trusted computing units to transmit and exchange data.

To facilitate multi-party secure computing in a distributed task scenario, computing tasks are grouped in advance according to some implementations of the present specification, and computing tasks for executing the same distributed task are grouped into the same group. Then, a trusted certificate generator 20 generates a digital certificate based on a task group and manages the digital certificate, so the user terminal and multiple trusted computing units perform multi-party secure computing through certificate generation and distribution management.

Specifically, the trusted certificate generator 20 distinguishes between task groups by group identifiers. For a certain task group, for example, referred to as a first task group, the trusted certificate generator generates a certificate chain and a private key for the first task group, where the certificate chain includes a public key certificate and a corresponding root certificate, and the public key certificate matches the private key to form a certificate pair. Then, the trusted certificate generator distributes the root certificate and the certificate pair to each trusted computing unit that is authenticated and that runs each computing task in the first task group. Therefore, multiple trusted computing units that run computing tasks in the same task group obtain the same certificate pair and root certificate. In addition, the trusted certificate generator distributes the root certificate in the certificate chain to a user terminal 30 that requests a computing service of the first task group.

Next, for a certain trusted computing unit that runs a certain computing task in the first task group, the trusted computing unit can be used as a transport layer security (TLS) protocol server that provides a computing service, the certificate pair is set as a certificate pair of the TLS server, or the trusted computing unit can be used as a TLS client connected to another computing unit in the same task group, and the root certificate is set as a trusted root certificate of the TLS client.

For a user terminal that requests a computing service of the first task group, the user terminal can be used as a TLS client, and a root certificate distributed to the user terminal is set as a trusted root certificate of the TLS client.

The certificate pair and the root certificate form a certificate chain, and the TLS client shook hands only with a TLS server that has the corresponding certificate pair in the same certificate chain. Therefore, it is ensured that a user terminal that requests the first task group shook hands only with a trusted computing unit that runs each computing task in the first task group, and each trusted computing unit that runs each computing task in the first task group can shake hands with each other to establish a trusted channel, thereby implementing multi-party secure computing.

The following describes specific implementations of the previous concept.

First, in a configuration phase, a group is set for each computing task, so multiple computing tasks that execute the same distributed task form a task group. A group identifier is assigned to the formed task group. Therefore, each task group has one group identifier. Then, each computing task learns of a group identifier of a task group to which the computing task belongs, and the trusted certificate generator learns of group information, so as to generate a certificate chain for each group.

In some implementations, the above task group configuration is performed by a configuration manager, and group configuration information is notified by the configuration manager to the trusted certificate generator and each computing task.

Figure 2:
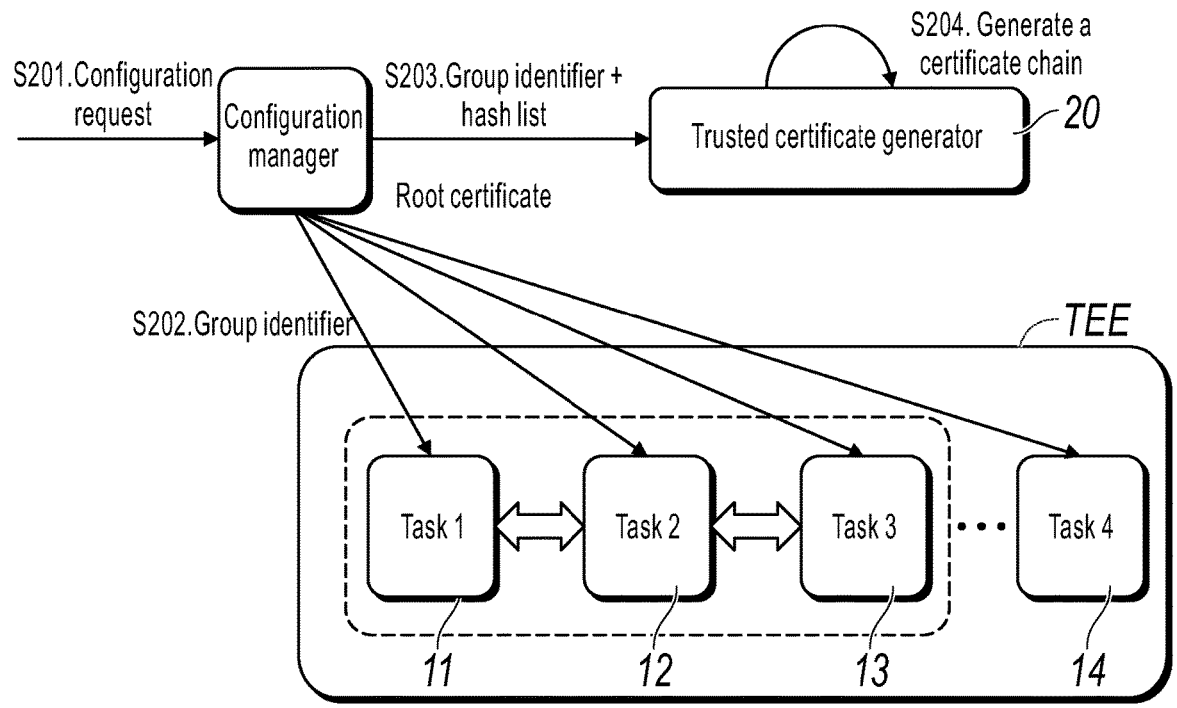
FIG. 2 is a schematic diagram illustrating a process of performing group configuration by using a configuration manager, according to some implementations.

FIG. 2 is a schematic diagram illustrating a process of performing group configuration by using a configuration manager, according to some implementations. As shown in the figure, in step S201, the configuration manager can receive a group configuration request or a configuration operation performed by a configuration person, where the group configuration request or the configuration operation instructs to classify multiple computing tasks into one task group. For simplicity, the task group is referred to as a first task group. The configuration person can be an administrator of the configuration manager, an administrator of a distributed computing system, or even a user requesting a computing service. After the configuration request or configuration operation is received, the configuration manager allocates a group identifier to the formed first task group, which is referred to as a first group identifier, and establishes a correspondence between the first group identifier and the previous multiple computing tasks included in the first task group.

Specifically, in an example, assume that three computing tasks in FIG. 1: task 1, task 2, and task 3 are used to execute the same distributed task, the configuration person can set in the configuration manager to classify the three computing tasks into one task group. Therefore, the configuration manager allocates a group identifier GID1 to the task group, and establishes a correspondence between GID1 and task 1, task 2, and task 3.

Next, in step S202, the configuration manager notifies the first group identifier to the multiple computing tasks included in the first task group. For example, GID1 is separately notified to task 1, task 2, and task 3.

On the other hand, in step S203, the configuration manager sends a configuration notification to a trusted certificate generator, where the notification includes the first group identifier and a first hash list corresponding to the first group identifier, and the first hash list includes code hashes of all computing tasks belonging to the first task group.

Still using the previous example, for the task group formed by task 1, task 2, and task 3, the configuration manager can form a hash list 1 corresponding to GID1, where hash list 1 includes code hashes H1, H2, and H3 of the three computing tasks: task 1, task 2, and task 3. Therefore, the configuration manager can send a configuration notification for the task group to the trusted certificate generator, where the configuration notification includes GID1 and the corresponding hash list 1: {H1, H2, H3}.

It can be understood that steps S202 and S203 can be performed in any sequence.

In some implementations, after receiving the configuration notification, the trusted certificate generator records a correspondence between the first group identifier and the first hash list for subsequent verification, and generates a corresponding certificate in a subsequent certificate issuing phase.

More preferably, in some other implementations, the trusted certificate generator correspondingly generates a certificate by using the configuration notification as a certificate generation request. Specifically, in step S204, the trusted certificate generator determines whether a certificate chain corresponding to the first group identifier exists; if the certificate chain exists, rejects a generation request and no longer generates the certificate chain; or if the certificate chain does not exist, generates a first certificate chain and a first private key for the first group identifier. The first certificate chain includes a first root certificate and a corresponding first public key certificate, and the first public key certificate matches the first private key to form a first certificate pair.

The following briefly describes the certificate chain and the certificate pair.

A digital certificate is an electronic document issued by a certificate authority (CA) to authenticate validity of a holder's identity, so as to prevent third-party forgery. Generally, the digital certificate includes holder information, the holder's public key, issuer information, and a signature of the issuer. Because the digital certificate includes a public key generated for the holder, such a digital certificate is also referred to as a public key certificate. Correspondingly, the certificate authority further generates a private key that matches the holder's public key, and the public key and the private key form an asymmetric encryption key pair. In this case, the public key certificate and the private key form a certificate pair.

Figure 3:
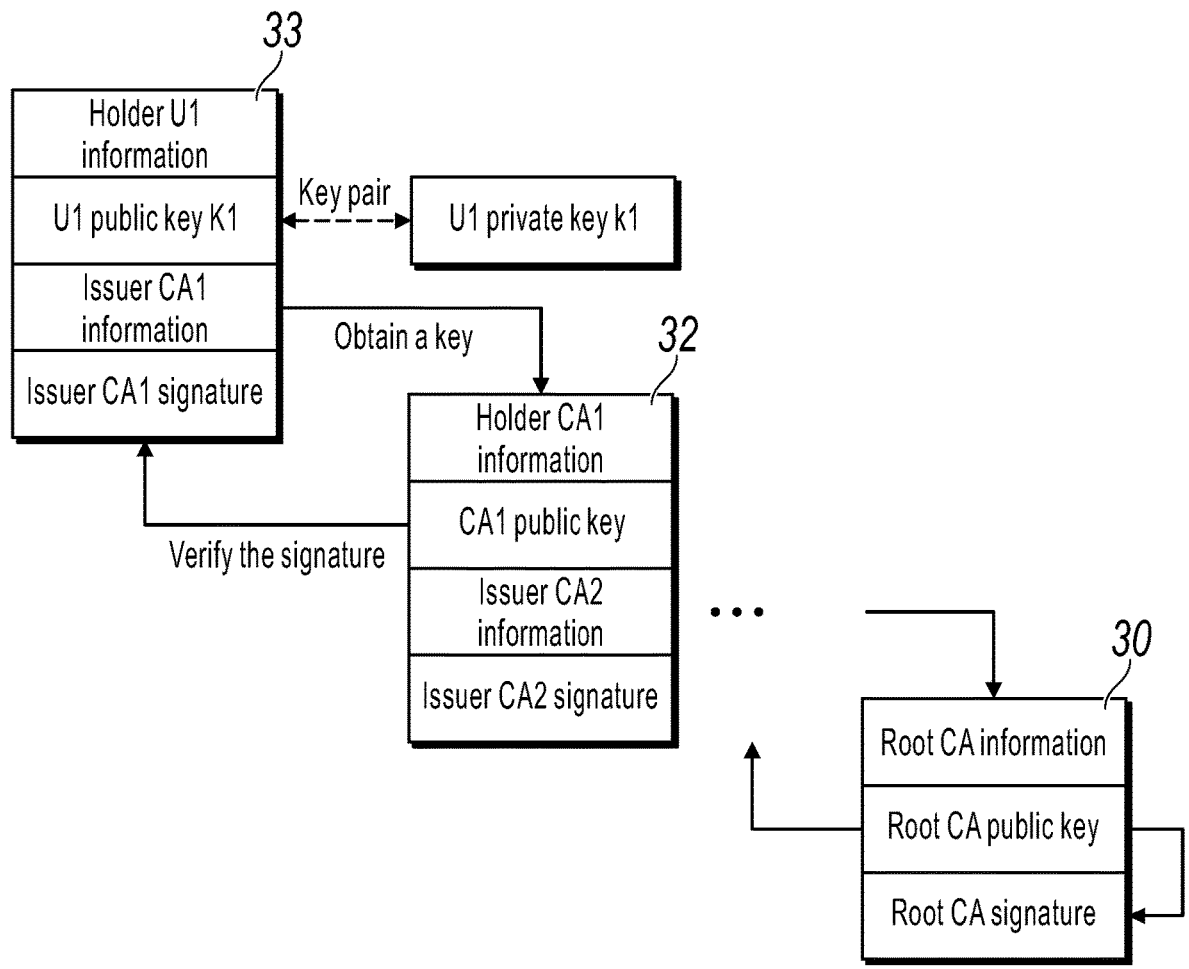
FIG. 3 shows a certificate chain and a certificate pair of a digital certificate in an example.

FIG. 3 shows examples of certificate chain and a certificate pair of digital certificates. Assume that a digital certificate 33 is a public key certificate issued by a certificate authority CA1 to a holder U1, the certificate 33 includes information about the holder U1, a public key K1 of the holder U1, information about the issuer CA1, and a signature of the issuer CA1. The issuer CA1 further generates a private key k1 corresponding to a public key K1. Therefore, the certificate 33 and the private key k1 constitute a certificate pair.

When a verifier wants to authenticate the certificate 33, the verifier can use the public key of the issuer CA1 for verification. However, if the verifier does not trust the issuer CAL it is necessary to trace up to obtain the certificate of CA1 to verify whether CA1 is valid and trustworthy. Therefore, a certificate 32 can be traced. The certificate 32 is a certificate issued by a certificate authority CA2 to CA1. The certificate 32 includes information about CA1 (in this case, CA1 is a certificate holder), CA1's public key, information about the issuer CA2, and a signature of the issuer CA2. The verifier can verify the CA1 signature in the certificate 33 by using the CA1's public key in the certificate 32. However, if the verifier still does not sufficiently trust the certificate authority CA2, upward tracing is needed until the final root certificate 30 is obtained.

A root certificate is a certificate issued by a root CA to itself. The root CA is usually the most trustworthy CA center and must be trusted. As shown in the figure, the root certificate 30 includes root CA information (in this case, the root CA is both a holder and an issuer), the root CA's public key, and signature information given by the root CA to the root CA itself.

As such, the root certificate 30 and each public key certificate form a certificate chain or a trust chain, where the root certificate is issued by the root CA to the root CA itself, and subsequent public key certificates are issued by the root CA and each CA authorized by the root CA by level. The root certificate is the starting point of the certificate chain. Levels of the certificate chain depend on actual situations.

Referring back to FIG. 2, similar to the previous certificate chain, in step S204, the trusted certificate generator generates a first certificate chain for the currently requested first task group. The certificate chain includes the first public key certificate generated for the first group identifier, the trusted certificate generator serves as the first root certificate self-signed by the root CA, and the first root certificate and the first public key certificate form a certificate chain. The trusted certificate generator further generates a first private key, and the first private key matches a public key in the first public key certificate to form a first certificate pair. The first certificate chain and the first private key are subsequently distributed to the user terminal and the trusted computing units that run computing tasks in the first task group.

It can be understood that FIG. 2 shows the process of performing task group configuration by using the configuration manager. However, the task group configuration can also be implemented in another way. For example, the trusted certificate generator and each computing task can be directly configured by the configuration person.

Specifically, in some implementations, the trusted certificate generator has a configuration interface. The configuration person can directly enter group information of a computing task to the trusted certificate generator by using the configuration interface. The group information includes a group identifier of a task group and a corresponding hash list, so the trusted certificate generator records the group information, and optionally generates a corresponding certificate chain for each group identifier. The configuration person can further set, by configuring a starting item of the computing task or a starting item of the trusted computing unit, a group identifier of a task group to which each computing task belongs. As such, the task group information is configured for each computing task and the trusted certificate generator.

After task group configuration is performed, the trusted certificate generator can separately issue certificates to the trusted computing unit and the user terminal, to implement multi-party secure computing among them.

Figure 4:
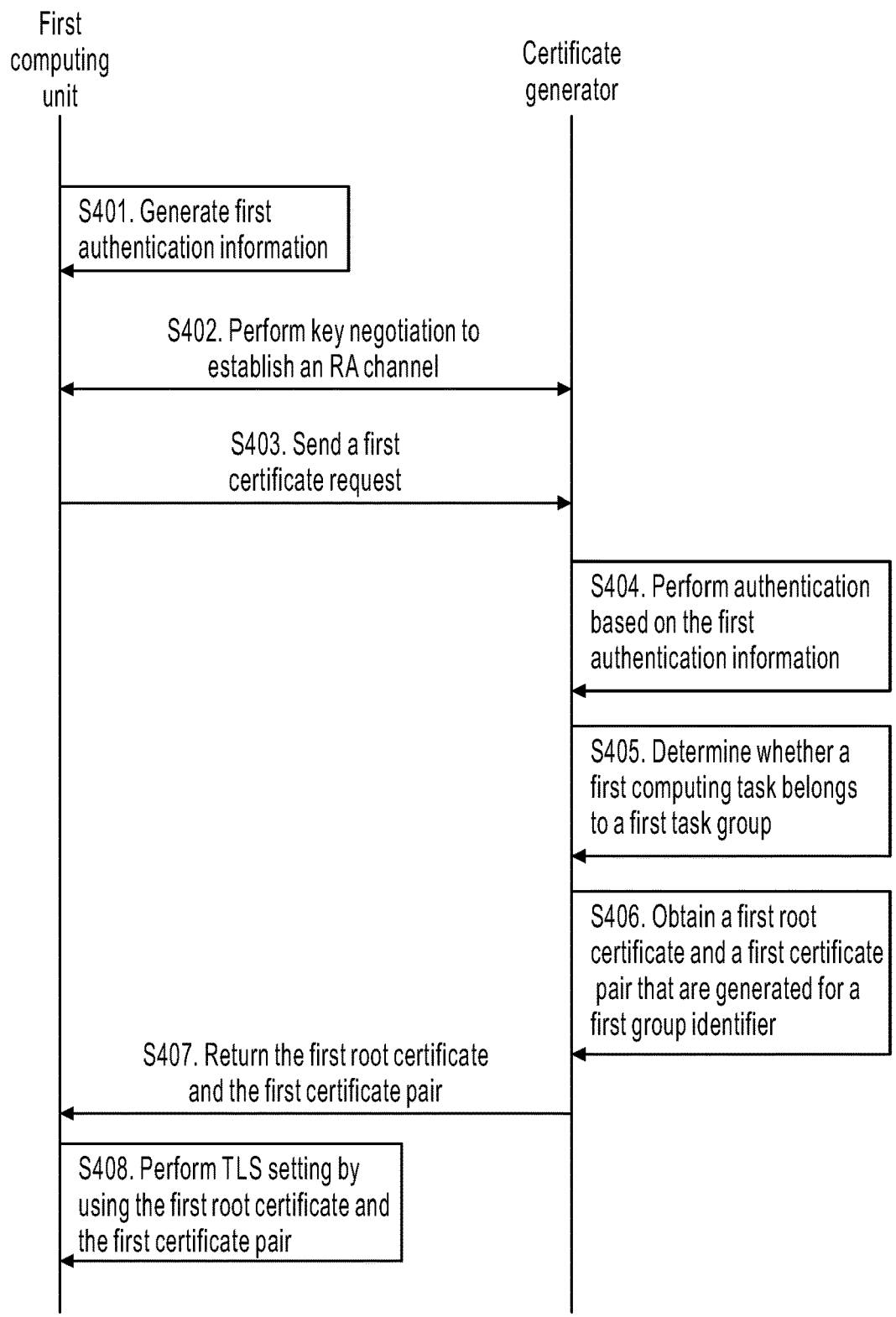
FIG. 4 is a schematic diagram illustrating a process of issuing a certificate for a computing unit, according to some implementations.

FIG. 4 is a schematic diagram illustrating a process of issuing a certificate for a computing unit, according to some implementations. By using the process in FIG. 4, a trusted certificate generator distributes a digital certificate to a first computing unit running a first computing task, so the first computing unit subsequently participates in multi-party computing related to a computing service. It can be understood that the first computing task can be any computing task, and the first computing unit can be any trusted computing unit that executes the task. In addition, in the group configuration phase, the first computing task is preconfigured to belong to a certain task group, which is referred to as a first task group. It can be understood that the first task group can further include at least one other computing task.

In the previous example, assume that task 1, task 2, and task 3 shown in FIG. 1 are configured to form a task group. Then, the first computing task in FIG. 4 can be any one of task 1, task 2, and task 3. Correspondingly, the first computing unit can be any one of trusted computing units 11, 12, and 13. More specifically, it can be assumed that the first computing task is task 1, and the first computing unit is a trusted computing unit 11.

The following describes the process of issuing a certificate.

Step S401: When the first computing task is started in the first computing unit, generate first authentication information used by another party to perform trusted authentication on the first computing unit. The trusted authentication is generally implemented through remote attestation (RA). Therefore, the generated authentication information is referred to as RA information or an RA report.

In some implementations, the first computing unit generates a unit report file of the first computing unit as the previous first authentication information. The unit report file is used to describe a configuration state and a running state of the first computing unit. Specifically, the unit report file includes at least a code hash of the running first computing task, which is referred to as a first code hash. It can be understood that the first code hash can uniquely identify the running first computing task. Optionally, the unit report can further include other description information, such as a name, a version, and attribute information, of the running first computing task.

The unit report file further includes signature information of the first computing unit, so as to ensure that the unit report file is authentic and reliable, and prevent forgery and tampering. The signature information can be obtained in various signature ways, such as a hash algorithm and an encryption algorithm. In some implementations, the signature information depends on a hardware key corresponding to the first computing unit, and the hardware key uniquely corresponds to physical hardware. As such, it is ensured that the signature information in the unit report file is actually generated by a trusted computing unit based on the hardware.

In some implementations, the unit report file further includes hardware information of the first computing unit, such as a CPU primary frequency and a memory capacity. In some implementations, the unit report file further includes running environment information of the first computing unit, thereby more fully describing a current running state. In some other implementations, the unit report file can further include other user-defined data to describe and define additional information of the trusted computing unit as needed.

As such, the generated unit report file can be used as the first authentication information, and is used by another party to perform trusted authentication on the first computing unit.

In some implementations, after generating the unit report file, the first computing unit sends the unit report file to a third-party authentication authority for authentication, so as to obtain an authentication result file as the first authentication information.

It can be understood that the third-party authentication authority is a trustworthy and capable authoritative authentication authority. Generally, assume that each trusted computing unit registers with the third-party authentication authority before being used. Therefore, the third-party authentication authority records a configuration state of each trusted computing unit that can be used for subsequent authentication on the computing unit.

For example, when the first computing unit is a trusted enclave implemented by using Intel SGX, the third-party authentication authority is an Intel attestation server. When the first computing unit is implemented in another way, the third-party authentication authority can be an authority for producing and deploying a corresponding computing unit or an associated authority of the third-party authentication authority.

After receiving the unit report file of the first computing unit, the third-party authentication authority can authenticate security and credibility of the first computing unit based on the unit report. Specifically, the third-party authentication authority first authenticates, based on the signature information in the unit report file, whether the unit report file is authentic and not tampered with, and determines, based on maintained pre-registration information of each trusted computing unit, whether the first computing unit is trustworthy. In addition, the third-party authentication authority further verifies, based on the information about the first computing task in the unit report file, whether program code of the first computing task runs in a TEE, and verifies whether the first code hash meets expectations.

When the unit report file is verified successfully, the third-party authority can add a signature of the third-party authority to the unit report file to generate an authentication result file. That is, the authentication result file includes the signature information of the third-party authentication authority.

After obtaining the authentication result file returned by the third-party authentication authority, the first computing unit can use the authentication result file as the first authentication information, which is used as a certificate of the trusted computing unit.

In addition, in step S402, the first computing unit performs key negotiation with the trusted certificate generator to establish a trusted channel, which is also referred to as an RA channel.

Specifically, the first computing unit and the trusted certificate generator can determine a common key or a key pair in various key negotiation ways. For example, a Diffie-Hellman (DH) key exchange method or an ECDH key exchange method based on an elliptic curve is used. A trusted channel can be established by using the negotiated key or key pair, so as to ensure that data transmitted by using the trusted channel can be obtained by only both parties.

It should be understood that step S401 and step S402 may not be limited to the sequence shown in FIG. 4, and the two steps may be transposed or may be performed in parallel.

Next, in step S403, by using the RA channel, the first computing unit sends a certificate acquisition request to the trusted certificate generator, which is referred to as a first certificate request. The first certificate request includes a group identifier of a first task group to which the first computing task belongs, which is referred to as a first group identifier, and the first authentication information obtained in step S401. The first authentication information includes the first code hash of the first computing task. The first group identifier is notified or configured to the first computing task in the task group configuration phase. Therefore, when the first computing task is started in the first computing unit, the first group identifier configured previously can be directly obtained, and the first group identifier is included in the first certificate request.

After the first certificate request is received, in step S404, the trusted certificate generator first performs authentication on the first computing unit based on the first authentication information.

As described above, in some implementations, the first authentication information can be a unit report file generated by the first computing unit. In this case, the trusted certificate generator sends the unit report file to the third-party authentication authority, and the third-party authentication authority performs verification. When the verification succeeds, an authentication result file is returned. The authentication result file includes the signature information of the third-party authentication authority. Therefore, the trusted certificate generator further verifies the signature information, and if the verification succeeds, it is considered that the first computing unit is authenticated.

In some other implementations, the first authentication information can be an authentication result file received by the first computing unit from the third-party authentication authority. In such case, the trusted certificate generator only needs to verify the signature information in the authentication result file. If the verification succeeds, it is considered that the first computing unit is authenticated.

If the authentication on the first computing unit succeeds, in step S405, the trusted certificate generator determines, based on the first code hash, whether the first computing task belongs to the first task group.

As described above, in the task group configuration phase, the trusted certificate generator obtains, by using the configuration manager or the configuration interface, a hash list corresponding to each task group. The hash list includes code hashes of all computing tasks belonging to the corresponding task group. Therefore, in step S405, the trusted certificate generator can read a pre-configured first hash list corresponding to the first group identifier. The first hash list includes code hashes of all computing tasks belonging to the first task group. Then, the trusted certificate generator determines whether the first code hash included in the first authentication information is in the first hash list; if yes, it is determined that the first computing task belongs to the first task group.

For example, assume that the first certificate request in step S403 includes the first group identifier GID1, and the first authentication information includes the first code hash H1. In step S405, the trusted certificate generator can read, based on the group identifier GID1, the corresponding hash list 1 obtained in the configuration phase: {H1, H2, H3}. Then, the trusted certificate generator determines whether the first code hash H1 is included in the hash list 1, and further determines whether the first computing task belongs to the first task group.

If the first computing task does not belong to the first task group, the trusted certificate generator rejects the certificate request and returns error information. If determining that the first computing task belongs to the first task group, the trusted certificate generator continues to perform subsequent steps.

Next, in step S406, the trusted certificate generator obtains a first certificate chain and a first private key that are generated for the first group identifier.

In some implementations, in the group configuration phase, the trusted certificate generator has generated a corresponding certificate chain for a group identifier of each task group. In such case, in step S406, the trusted certificate generator reads the first certificate chain and the first private key that are pre-generated for the first group identifier.

In some other implementations, in the group configuration phase, the trusted certificate generator records only the group identifier of each task group and the corresponding hash list. In a certificate distribution phase, the trusted certificate generator generates a certificate chain for each group identifier. Correspondingly, in step S406, the trusted certificate generator determines whether a certificate chain corresponding to the first group identifier exists. If the certificate chain exists (for example, another computing unit that runs another computing task in the same task group sends a certificate request prior to the first computing unit), the generated certificate chain is read as the first certificate chain. If the certificate chain does not exist, the trusted certificate generator generates the first certificate chain and the first private key for the first group identifier.

As described above, the first certificate chain includes a first root certificate and a corresponding first public key certificate, the first root certificate is used by the trusted certificate generator as a certificate self-signed by a root CA, and the first public key certificate is a downstream public key certificate of the first root certificate and matches the first private key to form the first certificate pair.

In different implementations, the first public key certificate and the first root certificate can use multiple formats, for example, a standard format X.509 certificate of a public key certificate in cryptography.

In addition, it should be understood that, the trusted certificate generator generates different certificate chains for different task groups, that is, different group identifiers. A correspondence exists between a root certificate and a public key certificate in one certificate chain, and root certificates in different certificate chains are different from each other.

Correspondingly, for the first certificate chain, the first root certificate is the starting point of the trust chain, and corresponds to the first public key certificate. In different implementations, the first public key certificate corresponds to the first root certificate in different ways.

Figure 5:
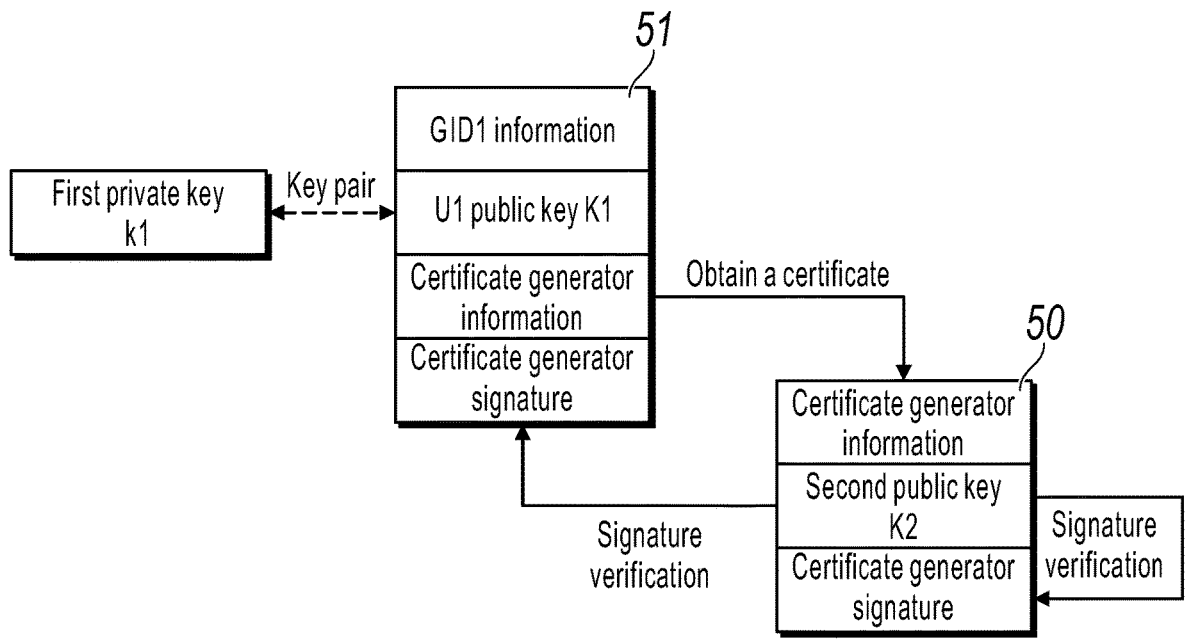
FIG. 5 shows a first certificate chain in some implementations.

FIG. 5 shows a first certificate chain in some implementations. In FIG. 5, certificate 51 is a first public key certificate, and includes information about a first task group (for example, denoted as GID1) as a certificate holder, first public key K1 (public key generated for GID1), information about a certificate generator as an issuer, and first signature information signed by the trusted certificate generator. First private key k1 matches first public key K1. Certificate 50 is a first root certificate, and includes information about the trusted certificate generator (both as a certificate holder and as an issuer), second public key K2 (an external signature public key of the trusted certificate generator), and second signature information self-signed by the trusted certificate generator. Both the first signature information in first public key certificate 51 and the second signature information in first root certificate 50 are checked by using second public key K2. In addition, second public key K2 is generated for the first group identifier of the first task group. As such, both first root certificate 50 and first public key certificate 51 uniquely correspond to the first group identifier.

Figure 6:
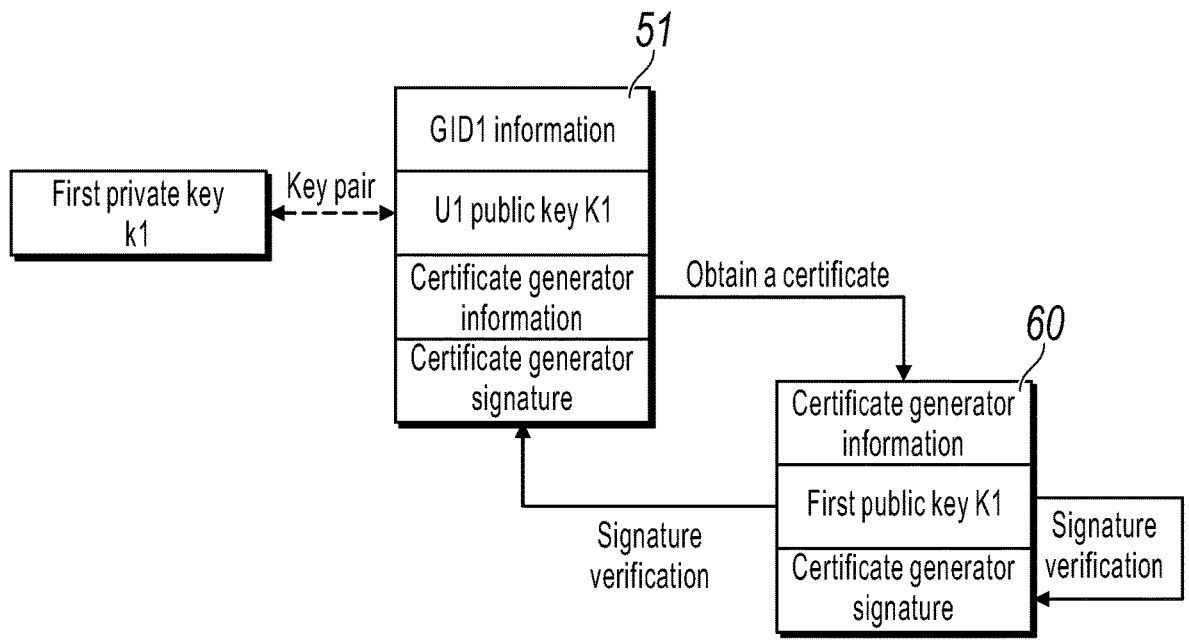
FIG. 6 shows a first certificate chain in some other implementations.

FIG. 6 shows a first certificate chain in some other implementations. In FIG. 6, certificate 61 is a first public key certificate, and includes information about a first task group (for example, denoted as GID1) as a certificate holder, first public key K1 (public key generated for GID1), information about a certificate generator as an issuer, and first signature information signed by the trusted certificate generator. Certificate 60 is a first root certificate, and includes information about the trusted certificate generator (both as a certificate holder and an issuer), first public key K1, and second signature information self-signed by the trusted certificate generator.

It can be seen that the difference between FIG. 6 and FIG. 5 lies in that in first root certificate 60 in FIG. 6, first public key K1 generated for GID1 is also used as the external signature public key of the trusted certificate generator. Therefore, both the first signature information in first public key certificate 61 and the second signature information in first root certificate 60 are checked by using first public key K1. As such, public key generation of the certificate chain is simplified. In addition, because first public key K1 is generated for GID1, both first root certificate 60 and first public key certificate 61 uniquely correspond to the first group identifier.

In other examples, the first public key certificate and the first root certificate can correspond to each other even separated by more levels (e.g., certificates 33 and 30 in FIG. 3).

As such, the trusted certificate generator obtains the first root certificate, the first public key certificate, and the first private key that are generated for the first group identifier.

Next, in step S407, the trusted certificate generator sends a certificate report to the first computing unit by using the previously established trusted channel, that is, the RA channel. The certificate report is referred to as a first certificate report. The first certificate report includes the first root certificate, and the first certificate pair consisting of the first public key certificate and the first private key. By using the RA channel, content of the first certificate report cannot be obtained by other computing units.

After the first computing unit obtains the first certificate report, in step S408, the certificate in the first certificate report is used to strengthen an online service interface by using a transport layer security (TLS) protocol, so as to provide a basis for subsequently performing multi-party computing related to a computing service.

TLS is a security protocol decoupled from an upper application layer and is used to provide confidentiality and data integrity between two communication application programs. Application layer protocols such as the HTTP/RPC protocol can run transparently above the TLS protocol. The TLS protocol is used for negotiation and authentication needed during encrypted channel creation. Data transmitted by using the application layer protocol is encrypted when passing through the TLS protocol, thereby ensuring the confidentiality of communication.

Specifically, the TLS protocol supports a client-server communication method. A TLS client and a TLS server shake hands by using a certificate to establish an encrypted channel, so as to strengthen an upper-layer network service, such as an HTTP/RPC network service.

Correspondingly, in step S408, by using the first computing unit as a TLS server that provides a computing service of the first computing task, the first computing unit can set the received first certificate pair as a certificate pair of the TLS server. In addition, to cooperate with other computing tasks in the same task group, the first computing unit further sets itself as a TLS client connected to the other computing tasks and sets the first root certificate as a trusted root certificate of the TLS client. Therefore, the first computing unit can subsequently serve as the TLS server to provide the computing service of the first computing task to another TLS client that has the corresponding first root certificate, or can serve as the TLS client to communicate with another TLS server that has the first certificate pair and perform cooperative computing with the TLS server. This will be described in detail later.

As such, by using the process in FIG. 4, the first computing unit running the first computing task obtains the certificate and the private key that are generated for the first task group from the trusted certificate generator. It can be understood that all other computing units can execute the process shown in FIG. 4, and separately obtain certificates corresponding to task groups to which running computing tasks belong.

Figure 7:
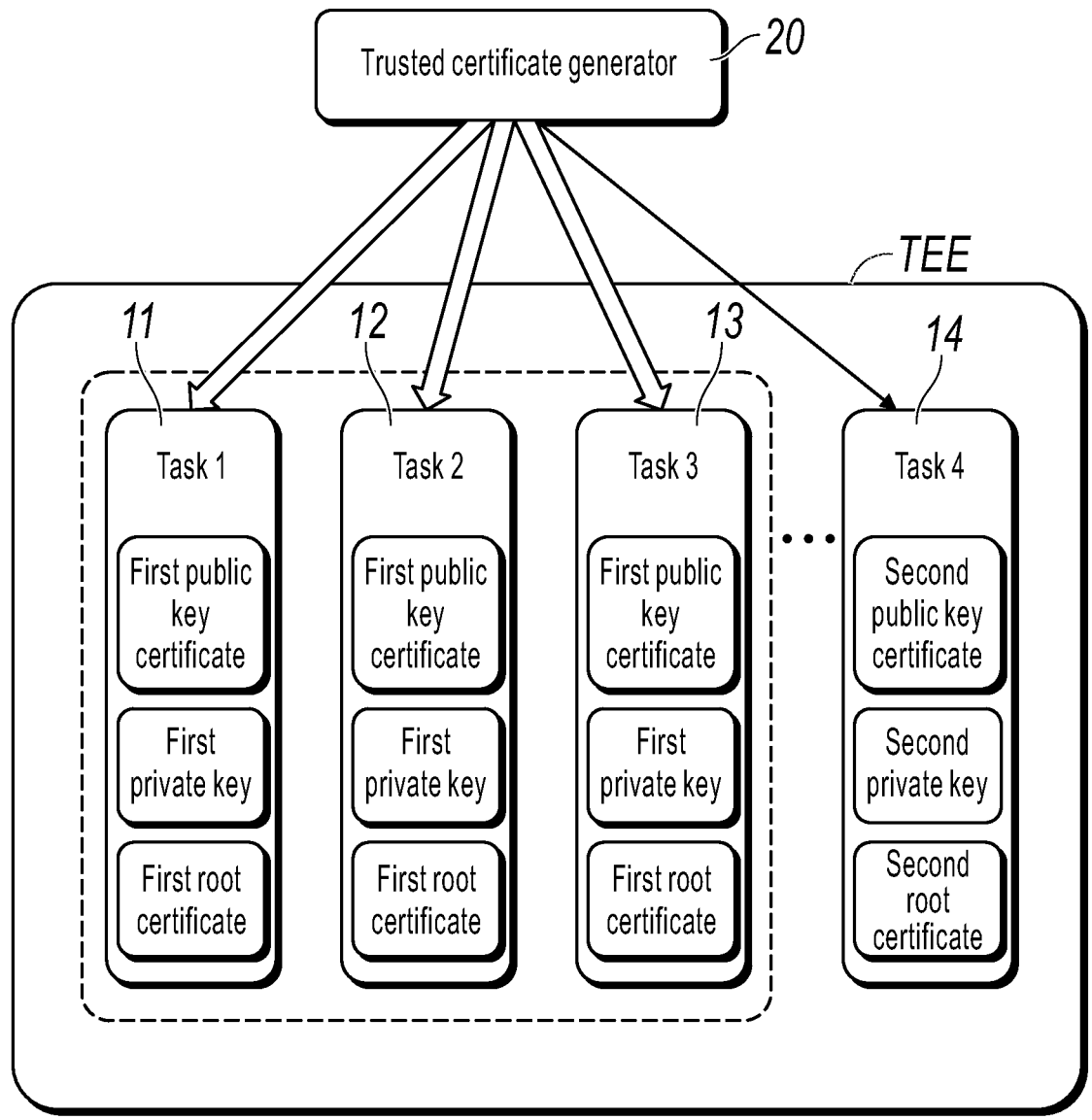
FIG. 7 shows a state of each computing unit after the process shown in FIG. 4 is executed.

FIG. 7 shows a state of each computing unit after the process shown in FIG. 4 is executed. As shown in FIG. 7, because trusted computing units 11, 12, and 13 separately execute task 1, task 2, and task 3, assume that task 1, task 2, and task 3 belong to the first task group, trusted computing units 11, 12, and 13 can obtain the first root certificate, the first public key certificate, and the first private key that are generated for the group identifier GID1 of the first task group. A trusted computing unit 14 runs task 4. Assume that task 4 belongs to a second task group. Therefore, the trusted computing unit 14 can obtain a second root certificate, a second public key certificate, and a second private key that are generated for the second task group. As such, each computing unit can obtain a certificate and a private key corresponding to a computing task run by the computing unit.

On this basis, the trusted certificate generator further distributes a corresponding certificate to a user terminal in response to a request of the user terminal, so the user terminal communicates with the trusted computing unit.

Figure 8:
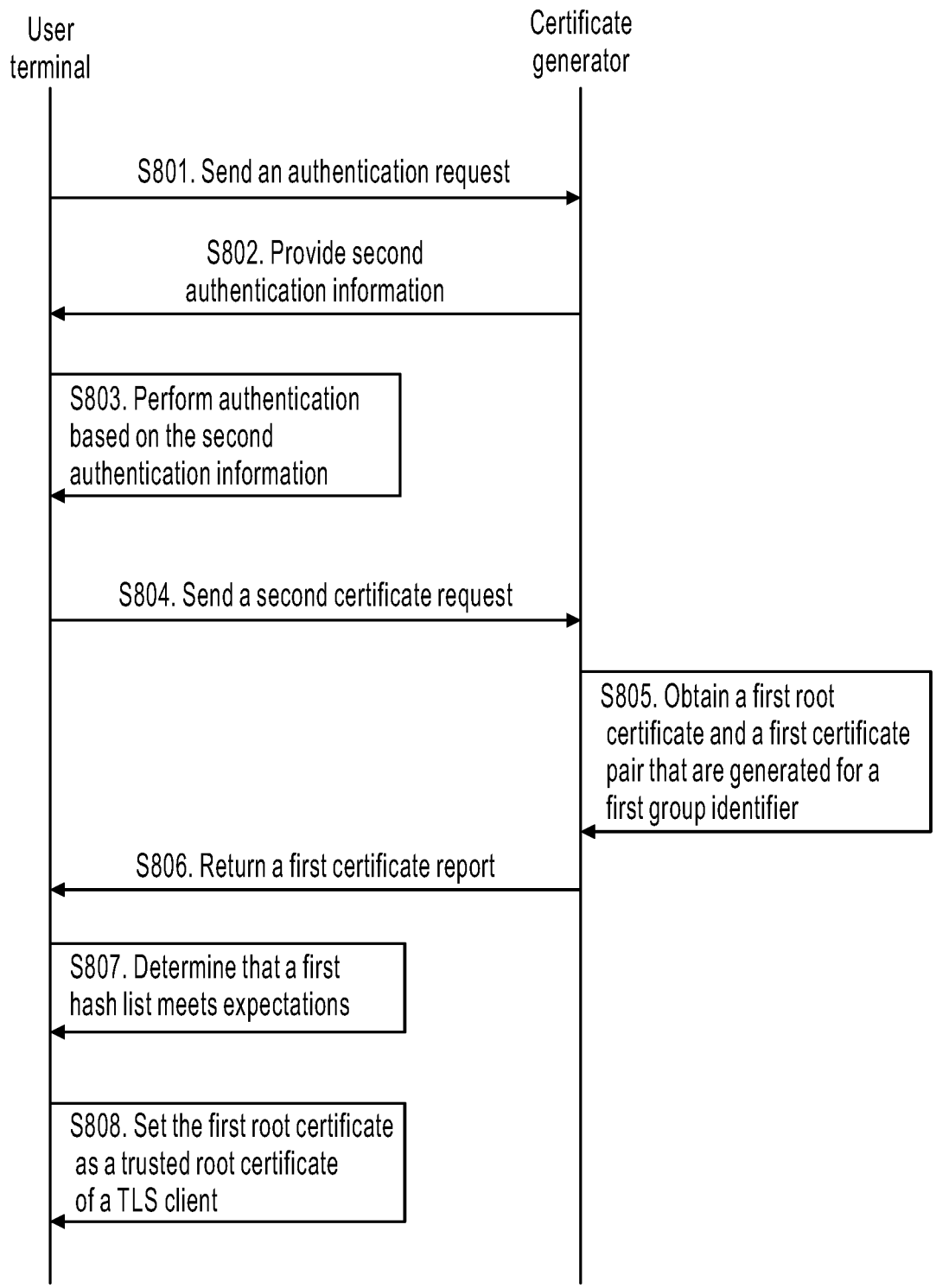
FIG. 8 is a schematic diagram illustrating a process of distributing a certificate to a user terminal, according to some implementations.

FIG. 8 is a schematic diagram illustrating a process of distributing a certificate to a user terminal, according to some implementations.

First, in step S801, the user terminal sends an authentication request to a trusted certificate generator to request to perform RA authentication on the trusted certificate generator.

Then, in step S802, the trusted certificate generator provides the user terminal with RA information of the trusted certificate generator, which is referred to as second authentication information, so the user terminal performs authentication.

Correspondingly, in step S803, the user terminal performs authentication on the trusted certificate generator based on the second authentication information.

Similar to authentication on the trusted computing unit, in some implementations, the trusted certificate generator generates a report file of the trusted certificate generator. The report file includes a code hash and signature information of the trusted certificate generator. Optionally, the report file further includes other configuration description information of the trusted certificate generator. Then, in step S802, the trusted certificate generator sends the report file as the second authentication information to the user terminal.

In step S803, the user terminal sends the report file to a third-party authentication authority. Similar to the previous description, the third-party authentication authority performs verification based on the signature information and the code hash of the report file, and after the verification succeeds, adds a signature to the report file as an authentication result file. Therefore, the authentication result file includes signature information of the third-party authentication authority. Then, the user terminal can perform verification on the signature information and perform authentication on the trusted certificate generator.

In some other implementations, after generating the report file, the trusted certificate generator sends the report file to a third-party authentication authority and obtains an authentication result file from the third-party authentication authority. In step S802, the trusted certificate generator provides the authentication result file as the second authentication information to the user terminal. Correspondingly, in step S803, the user terminal only needs to verify the signature information in the authentication result file, to implement authentication on the trusted certificate generator.

After the trusted certificate generator is authenticated, in step S804, the user terminal sends a certificate request to the trusted certificate generator, which is referred to as a second certificate request. The second certificate request includes a first group identifier of a first task group that the user terminal expects to connect. In a specific example, the user terminal can query a configuration manager for the group identifier of the task group that the user terminal expects to connect, and include the group identifier in the second certificate request.

For example, in the schematic diagram of FIG. 1, if the user terminal wants to connect to the first task group consisting of task 1, task 2, task 3, the user terminal includes the group identifier of the task group, such as GID1, in the certificate request.

After receiving the second certificate request, the trusted certificate generator obtains, in step S805, a first certificate chain and a first private key that are pre-generated for the first group identifier. The first certificate chain includes a first root certificate and a corresponding first public key certificate, and the first public key certificate and the first private key form a first certificate pair. In addition, as shown in FIG. 4, the trusted certificate generator has pre-distributed the first certificate pair to at least one computing unit that is authenticated and that runs each computing task in the first task group.

Then, in step S806, the trusted certificate generator returns a certificate report to the user terminal, which is referred to as a second certificate report, and includes at least the first root certificate in the first certificate chain.

Optionally, in some implementations, the second certificate report further includes a first hash list corresponding to the first group identifier, and the first hash list includes code hashes of all computing tasks belonging to the first task group.

In such case, in step S807, the user terminal determines whether the first hash list meets expectations. Specifically, the user terminal determines whether each code hash included in the first hash list meets the expectations, that is, whether each code hash is a code hash of a computing task in a task group that the user terminal expects to connect. As such, the user terminal determines whether the task group information in the trusted certificate generator meets the expectations, and whether task program code behavior in the task group meets the expectations.

If the first hash list includes any unexpected code hash, the user terminal considers that task group information is inconsistent and refuses to trust a certificate sent by the trusted certificate generator.

If the first hash list meets the expectations, in step S808, by using the user terminal as a TLS client, the user terminal sets the received first root certificate as a trusted root certificate of the TLS client.

In addition, as shown in step S408 in FIG. 4 and FIG. 7, each computing unit that runs each computing task in the first task group obtains the first root certificate and the first certificate pair after passing authentication, and performs corresponding TLS setting. That is, by using the computing unit itself as a TLS client and a TLS server, the computing unit uses the first root certificate as a root certificate trusted by the TLS client and uses the first certificate pair as a certificate pair of the TLS server. After corresponding TLS setting is performed on the user terminal and each computing unit, secure multi-party computing can be performed by using the TLS protocol between the user terminal and each computing unit running the first task group, and between the computing units.

As described above, the TLS protocol supports the client-server communication method. Specifically, when the first root certificate and the first public key certificate constitute a certificate chain, a TLS client that uses the first root certificate as the only trusted root certificate can shake hands only with a TLS server that has the first certificate pair, so as to establish a TLS trusted channel. The TLS client with the first root certificate and the TLS server with the first certificate pair can implement the TLS handshake in the following way:

First, the TLS client initiates a handshake request, and the TLS server returns the first public key certificate and a generated random number N1 to the TLS client.

Because the TLS client has set the first root certificate as a unique trusted root certificate, and the first public key certificate is a certificate in the first root certificate trust chain, the TLS client will consider the first public key certificate to be trusted. Then, the TLS client generates another random number N2, encrypts the random number N2 by using the first public key in the first public key certificate, and sends the random number N2 to the TLS server.

The TLS server decrypts the random number N2 by using the first private key in the first certificate pair, and generates, based on the random numbers N1 and N2 and an agreed encryption algorithm, a session key used to encrypt subsequent transmission data. After the TLS client acknowledges the session key, the two parties successfully shake hands and establish a TLS trusted channel by using the session key. After the handshake succeeds, the TLS client can exchange data with the TLS server through the TLS trusted channel.

By using the communication mechanism between the TLS client and the server, the user terminal and the computing unit that runs the first task group can perform multi-party secure computing. Specifically, as a TLS client, the user terminal sets the first root certificate as a trusted root certificate, and each computing unit that runs each computing task in the first task group can be used as a TLS server and sets the first certificate pair as a certificate pair of the server. Therefore, the user terminal that requests the computing service of the first task group can establish a TLS trusted channel with each computing unit that runs each computing task in the first task group to perform secure communication. In addition, each computing unit can be used as a TLS client, and also sets the first root certificate as a trusted root certificate. Therefore, one computing unit serving as a TLS client can establish a TLS trusted channel with another computing unit serving as a TLS server, and the another computing unit is necessarily a computing unit that runs a computing task in the same task group. As such, secure multi-party computing is implemented between the user terminal and the multiple computing units.

It can be understood that in the process of FIG. 8, the user terminal performs RA authentication only on the trusted certificate generator, but does not perform RA authentication on each computing unit. However, it should be understood that, according to the process in FIG. 4, before distributing the certificate, the trusted certificate generator first performs RA authentication on the computing unit, and only when the authentication succeeds, the trusted certificate generator distributes the certificate to the computing unit. Therefore, that the user terminal performs RA authentication on the trusted certificate generator means that RA authentication is performed indirectly on the trusted computing unit. In addition, with reference to both the processes in FIG. 4 and FIG. 8, separate certificate distribution in the certificate chain is equivalent to simultaneously implementing RA authentication and TLS verification, thereby simplifying a secure authentication process.

In some implementations, the computing service of the first task group not only needs to exchange data between multiple parties, but also needs to store and read permanently stored data. In this case, in step S806 of FIG. 8, the trusted certificate generator can further include the first public key certificate in the second certificate report returned to the user terminal. Therefore, the user terminal can encrypt the user data by using the first public key certificate, and permanently store the encrypted user data in the data platform. As described above, each computing unit that runs each computing task in the first task group obtains the first certificate pair, where the first certificate pair includes the first private key. Therefore, the computing units can decrypt and obtain the user data by using the first private key in the first certificate pair. In addition, each computing unit can also encrypt generated intermediate data by using the first public key in the first certificate pair, and store the intermediate data in the data platform. Another computing unit can decrypt the intermediate data by using the first private key.

As such, it is ensured that data that needs to be permanently stored can only be obtained by a computing unit in the same task group.

Figure 9:
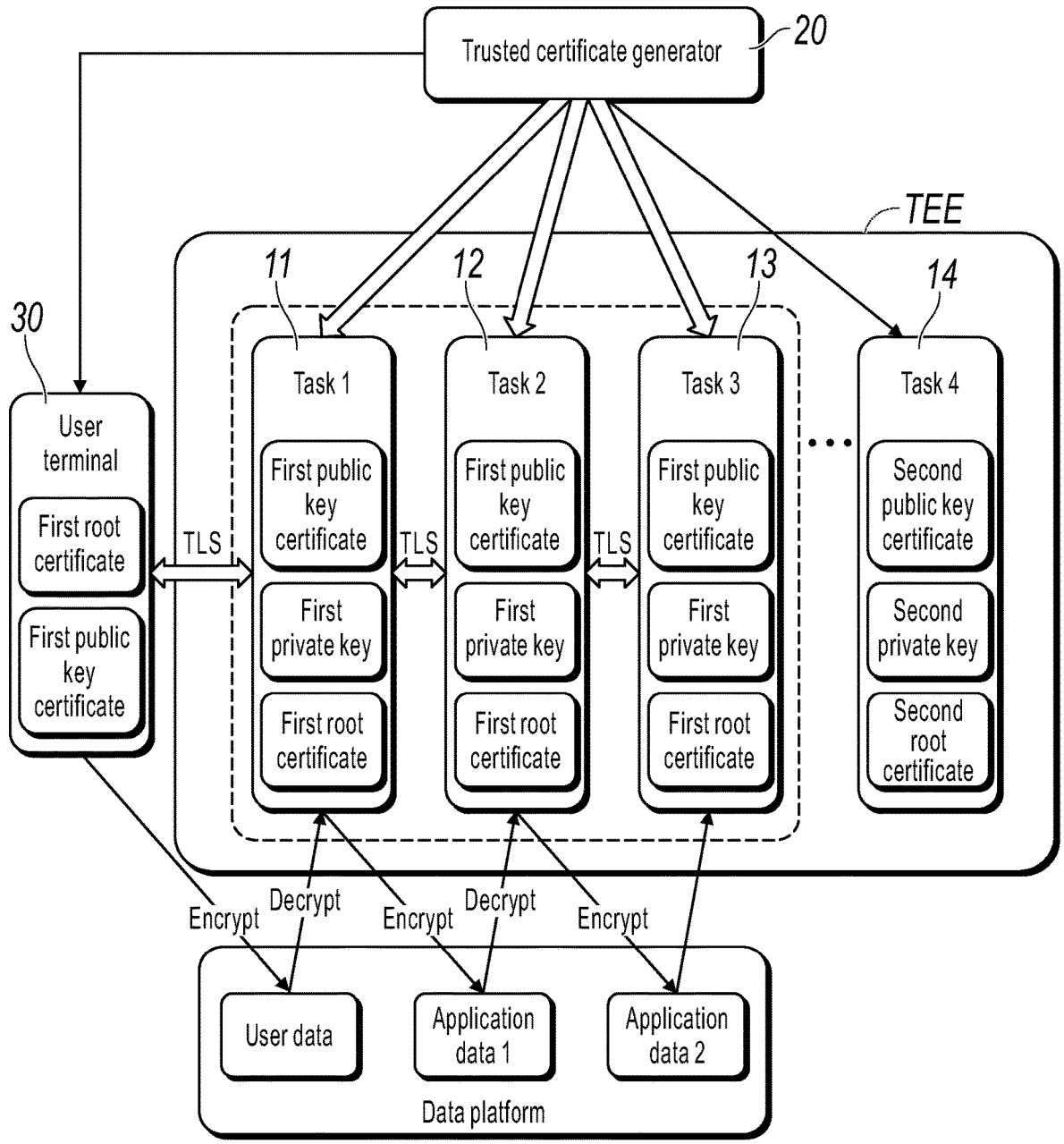
FIG. 9 shows a state of a system after the processes shown in FIG. 4 and FIG. 8 are executed.

FIG. 9 shows a state of a system after the processes shown in FIG. 4 and FIG. 8 are executed. As shown in FIG. 9, each computing unit that runs each computing task in the same task group obtains a root certificate and a certificate pair that are corresponding to the task group. For example, task 1, task 2, and task 3 belong to a first task group, and trusted computing units 11, 12, and 13 that run three computing tasks respectively obtain a first root certificate and a first certificate pair that are generated for the first task group. A trusted computing unit 14 that runs a computing task 4 in another task group obtains a different second root certificate and second certificate pair. In addition, a user terminal that requests a computing service of the first task group also obtains the first root certificate from a trusted certificate generator. The first root certificate is corresponding to a first public key certificate in the first certificate pair, and the first root certificate and the first public key certificate form a certificate chain. Optionally, the user terminal can also obtain the first public key certificate used to encrypt permanently stored data.

Based on the system state shown in FIG. 9, secure computing can be performed between the user terminal and multiple computing units by using the TLS protocol. With reference to FIG. 9, the following describes a process of performing multi-party computing by a computing unit running a certain computing task in the first task group, which is still referred to as a first computing unit.

Figure 10:
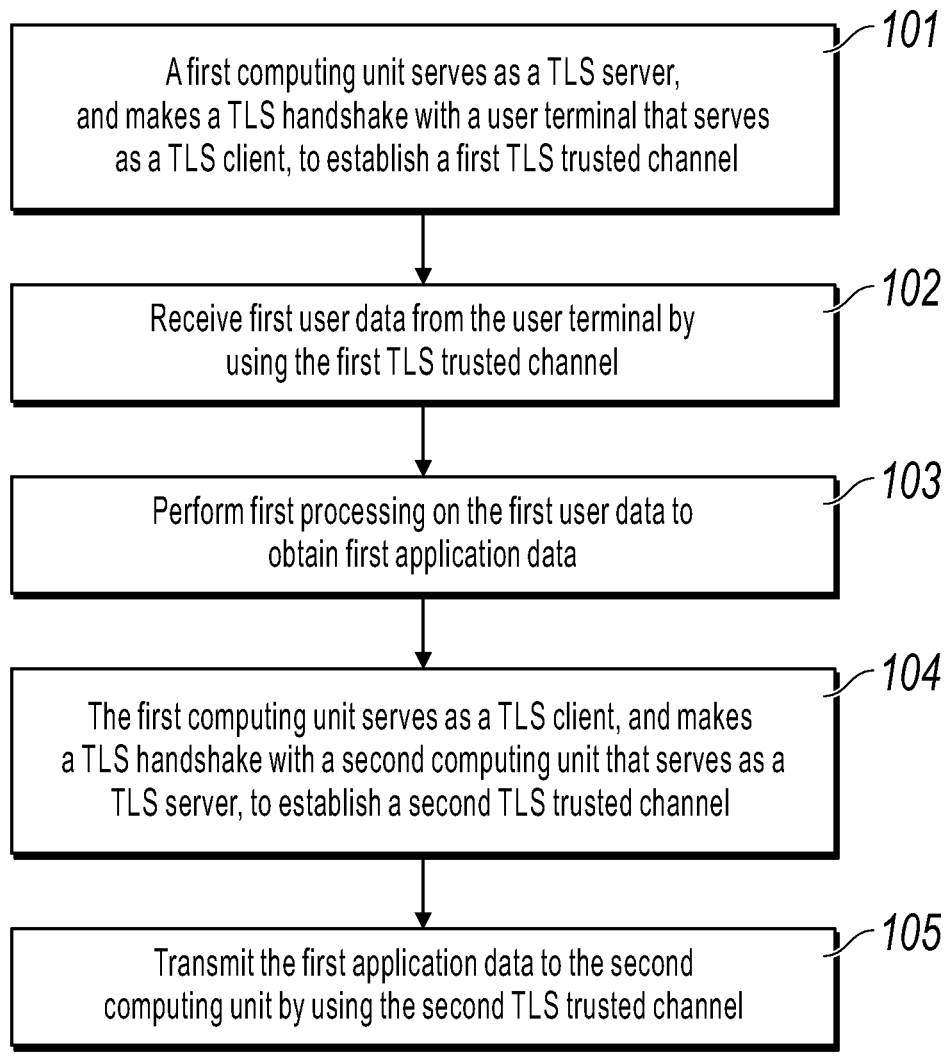
FIG. 10 is a flowchart illustrating a method for performing multi-party secure computing in some implementations.

FIG. 10 is a flowchart illustrating a method for performing multi-party secure computing in some implementations. It is worthwhile to note that the method in FIG. 10 is executed by the first computing unit that runs the first computing task in the first task group, and corresponding TLS setting has been completed on each computing unit that runs each computing task in the first task group and the user terminal, as shown in FIG. 9.

In this case, in step 101, the first computing unit serves as a TLS server, and makes a TLS handshake with the user terminal that serves as a TLS client, to establish a first TLS trusted channel. The handshake process is described above, and details are omitted here.

In step 102, the first computing unit receives first user data from the user terminal by using the first TLS trusted channel.

In step 103, the first computing task run by the first computing unit performs first processing on the first user data to obtain first application data.

In step 104, the first computing unit serves as a TLS client, and makes a TLS handshake with a second computing unit that serves as a TLS server, to establish a second TLS trusted channel. The second computing unit is a computing unit that runs another computing task in the first task group, that is, a second computing task.

In step 105, the first computing unit transmits the first application data to the second computing unit by using the second TLS trusted channel.

In the previous process, by using the TLS trusted channel, the first computing unit receives user data from the user terminal, processes the user data, and then transmits the user data to the second computing unit running a computing task in the same task group, so as to implement multi-party secure transmission and computing at least between the user terminal, the first computing unit, and the second computing unit.

Further, in some implementations, the computing service of the first task group needs to permanently store data. In this case, in an example, the method in FIG. 10 further includes the following: the first computing unit reads second user data from a data platform, where the second user data is generated by the user terminal through encryption by using the first public key certificate. Therefore, the first computing unit can decrypt the second user data by using the first private key, to obtain a corresponding data plaintext.

In some other implementations, the first computing unit generates intermediate data, and permanently stores the data. Another computing unit in the same task group can read the permanently stored data. Specifically, in an example, the method in FIG. 10 further includes the following steps. The first computing unit generates second application data, and then encrypts the second application data by using the first public key certificate to obtain second encrypted application data. The first computing unit then stores the second encrypted application data into the data platform, so another computing unit, for example, the second computing unit decrypts and obtains the second application data by using the first certificate pair.

In the previous process, the first computing unit can perform multi-party secure computing with the user terminal and another computing unit in the same task group.

Based on FIG. 9, the entire process is looked back: In some implementations of the present specification, a certificate is generated and distributed by a trusted certificate generator, to implement secure authentication and verification, so multi-party secure communication and computing are performed between a user terminal and a trusted computing unit. Specifically, computing tasks are grouped in advance to form task groups. The trusted certificate generator distinguishes between different task groups by group identifier, and generates one certificate chain and one private key for one group identifier. The certificate chain includes a root certificate and a corresponding public key certificate, and the public key certificate matches the private key to form a certificate pair. Then, the trusted certificate generator distributes the root certificate and the certificate pair to each trusted computing unit that is authenticated and that runs each computing task corresponding to the group identifier. Therefore, multiple trusted computing units that run computing tasks in the same task group obtain the same certificate pair and root certificate. In addition, the trusted certificate generator distributes the root certificate to a user terminal that requests a computing service of the task group. Therefore, multi-party secure communication can be performed by using the TLS protocol between the user terminal having the root certificate and the trusted computing unit having the root certificate and the certificate pair.

Figure 11:
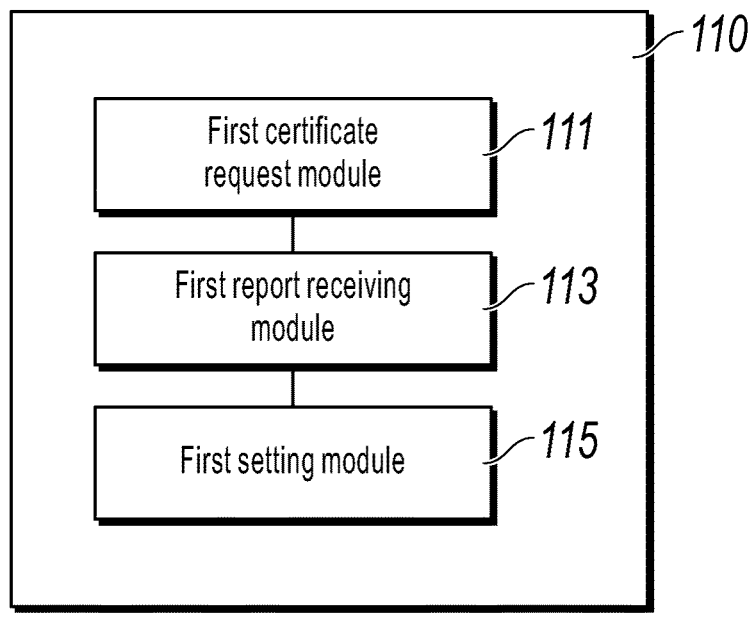
FIG. 11 is a schematic block diagram illustrating an apparatus for obtaining a certificate, which is deployed on a first computing unit, in some implementations.

In some implementations according to another aspect, an apparatus for obtaining a certificate to perform multi-party secure computing is provided, and the apparatus is deployed on a first computing unit running a first computing task. The first computing task is pre-configured to belong to a first task group, and the first task group further includes at least one other computing task. FIG. 11 is a schematic block diagram illustrating an apparatus for obtaining a certificate, which is deployed on a first computing unit, in some implementations. As shown in FIG. 11, the apparatus 110 includes: a first certificate request module 111, configured to send a first certificate request to a trusted certificate generator, where the first certificate request includes a first group identifier of the first task group and first authentication information, and the first authentication information is used to perform trusted authentication on the first computing unit and includes a first code hash of the first computing task; a first report receiving module 113, configured to receive a first certificate report from the trusted certificate generator, where the first certificate report includes a first certificate chain and a first private key that are generated for the first group identifier, the first certificate chain includes a first root certificate and a corresponding first public key certificate, and the first public key certificate matches the first private key to form a first certificate pair; and a first setting module 115, configured to use the first computing unit as a TLS server that provides a computing service of the first computing task, and set the first certificate pair as a certificate pair of the TLS server, and use the first computing unit as a TLS client connected to the at least one other computing task, and set the first root certificate as a trusted root certificate of the TLS client.

In some implementations, the first computing unit is implemented as a trusted enclave.

According to some implementations, the apparatus 110 further includes an authentication information generation module (not shown), configured to generate the first authentication information.

In some implementations, the authentication information generation module is configured to: generate a unit report file of the first computing unit, where the unit report file includes the first code hash and signature information of the first computing unit; and send the unit report file to a third-party authentication authority to obtain an authentication result file, where the authentication result file includes signature information of the third-party authentication authority; and include the authentication result file as the first authentication information into the first certificate request.

In some other implementations, the authentication information generation module is configured to: generate a unit report file of the first computing unit, where the unit report file includes the first code hash and signature information of the first computing unit; and include the unit report file as the first authentication information into the first certificate request.

According to some implementations, the apparatus 110 further includes a key negotiation module, configured to perform key negotiation with the trusted certificate generator before the first certificate request is sent to the trusted certificate generator, so as to establish a trusted channel, where the trusted channel is used to send the first certificate request and receive the first certificate report.

Figure 12:
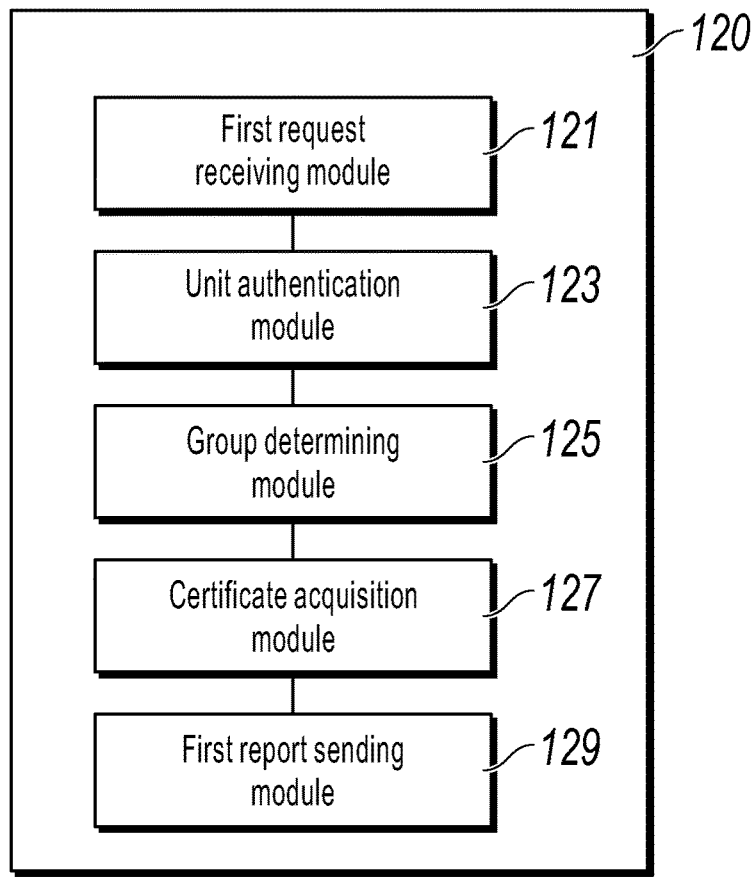
FIG. 12 is a schematic block diagram illustrating an apparatus for distributing a certificate to a computing unit in some implementations.

In some implementations according to another aspect, an apparatus for distributing a certificate to a computing unit is provided and deployed on a trusted certificate generator. The trusted certificate generator can be implemented by any device, platform, or device cluster with computing and processing capabilities. FIG. 12 is a schematic block diagram illustrating an apparatus for distributing a certificate to a computing unit in some implementations. As shown in FIG. 12, the apparatus 120 includes: a first request receiving module 121, configured to receive a first certificate request from a first computing unit running a first computing task, where the first certificate request includes a first group identifier of a first task group and first authentication information, and the first authentication information is used to authenticate the first computing unit and includes a first code hash of the first computing task; a unit authentication module 123, configured to perform authentication on the first computing unit based on the first authentication information; a group determining module 125, configured to: when the authentication succeeds, determine, based on the first code hash, whether the first computing task belongs to the first task group; a certificate acquisition module 127, configured to: when it is determined that the first computing task belongs to the first task group, obtain a first certificate chain and a first private key that are pre-generated for the first group identifier, where the first certificate chain includes a first root certificate and a corresponding first public key certificate, and the first public key certificate matches the first private key to form a first certificate pair; and a first report sending module 129, configured to send a first certificate report to the first computing unit, where the first certificate report includes the first root certificate and the first certificate pair, so serving as both a TLS server that provides a computing service and a TLS client connected to another computing task, the first computing unit sets the first certificate pair as a certificate pair of the TLS server, and sets the first root certificate as a trusted root certificate of the TLS client.

In some implementations, the first authentication information received by the first request receiving module 121 is an authentication result file authenticated by a third-party authentication authority, and the authentication result file includes signature information of the third-party authentication authority. In this case, the unit authentication module 123 is configured to: verify the signature information, and when the verification succeeds, determine that the first computing unit is authenticated.

In some other implementations, the first authentication information received by the first request receiving module 121 is a unit report file generated by the first computing unit, and the unit report file includes the first code hash and signature information of the first computing unit. In this case, the unit authentication module 123 is configured to: send the unit report file to a third-party authentication authority to obtain an authentication result file, where the authentication result file includes signature information of the third-party authentication authority; and verify the signature information, and when the verification succeeds, determine that the first computing unit is authenticated.

According to some implementations, the apparatus 120 further includes a certificate generation module (not shown), configured to: receive a first generation command from a configuration manager, where the first generation command includes the first group identifier and a first hash list corresponding to the first group identifier, and the first hash list includes code hashes of all computing tasks belonging to the first task group; and generate the first certificate chain and the first private key for the first group identifier.

According to some implementations, the group determining module 125 is configured to obtain a pre-configured first hash list corresponding to the first group identifier, where the first hash list includes code hashes of all computing tasks belonging to the first task group; and determine whether the first code hash is in the first hash list, and if yes, determine that the first computing task belongs to the first task group.

According to some implementations, the first public key certificate includes a first public key generated for the first group identifier, and first signature information signed by the trusted certificate generator, the first public key and the first private key constitute a key pair, the first root certificate includes a second public key generated for the first group identifier and second signature information self-signed by the trusted certificate generator, and the second public key is used to verify the first signature information and the second signature information.

According to some other implementations, the first public key certificate includes a first public key generated for the first group identifier, and first signature information signed by the trusted certificate generator, the first public key and the first private key constitute a key pair, the first root certificate includes the first public key and second signature information self-signed by the trusted certificate generator, and the first public key is used to verify the first signature information and the second signature information.

According to some implementations, the apparatus 120 further includes a key negotiation module (not shown), configured to: before the first certificate request is received, perform key negotiation with the first computing unit to establish a trusted channel, where the trusted channel is used to receive the first certificate request and send the first certificate report.

Figure 13:
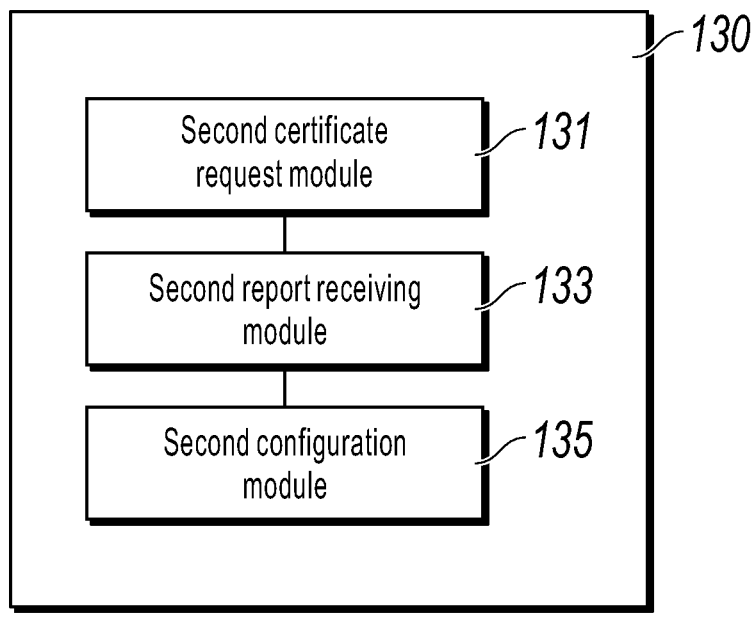
FIG. 13 is a schematic block diagram illustrating an apparatus for obtaining a certificate, which is deployed on a user terminal, in some implementations.

In some implementations according to still another aspect, an apparatus for obtaining a certificate to perform multi-party secure computing is provided and deployed on a user terminal. The user terminal can be implemented by using any device that has computing and processing capabilities. FIG. 13 is a schematic block diagram illustrating an apparatus for obtaining a certificate, which is deployed on a user terminal, in some implementations. As shown in FIG. 13, the apparatus 130 includes: a second request sending module 131, configured to send a second certificate request to a trusted certificate generator, where the second certificate request includes a first group identifier of a first task group that expects to be connected; a second report receiving module 133, configured to receive a second certificate report from the trusted certificate generator, where the second certificate report includes at least a first root certificate in a first certificate chain generated for the first group identifier, the first certificate chain further includes a first public key certificate corresponding to the first root certificate, and the first public key certificate and a matched first private key form a first certificate pair that is pre-distributed to at least one computing unit that is authenticated and that runs each computing task in the first task group; and a second configuration module 135, configured to use the user terminal as a TLS client, and set the first root certificate as a trusted root certificate of the TLS client, so as to communicate with the at least one computing unit that has the first certificate pair and that functions as a TLS server.

According to some implementations, the apparatus 130 further includes an authentication module (not shown), configured to: obtain second authentication information of the trusted certificate generator; and perform authentication on the trusted certificate generator based on the second authentication information.

Further, according to some implementations, the second authentication information is an authentication result file authenticated by a third-party authentication authority, and the authentication result file includes signature information of the third-party authentication authority. Correspondingly, the authentication module is configured to: verify the signature information, and when the verification succeeds, determine that the trusted certificate generator is authenticated.

According to some other implementations, the second authentication information is a report file generated by the trusted certificate generator, and the report file includes a code hash and signature information of the trusted certificate generator. Correspondingly, the authentication module is configured to: send the report file to a third-party authentication authority to obtain an authentication result file, where the authentication result file includes signature information of the third-party authentication authority; and verify the signature information, and when the verification succeeds, determine that the trusted certificate generator is authenticated.

According to some implementations, the second certificate report further includes a first hash list corresponding to the first group identifier, and the first hash list includes code hashes of all computing tasks belonging to the first task group. Correspondingly, the apparatus 130 further includes a hash confirmation module (not shown), configured to determine whether the first hash list meets expectations before the second configuration module 135 sets the first root certificate as a trusted root certificate of the TLS client.

According to some implementations, the apparatus 130 further includes a communications module (not shown), and after the second configuration module 135 sets the first root certificate as a trusted root certificate of the TLS client, the communications module is configured to make a TLS handshake with the at least one computing unit to establish a TLS trusted channel; and obtain a computing service of the first task group from the at least one computing unit by using the TLS trusted channel.

According to some implementations, the second certificate report further includes a first public key certificate. Correspondingly, the apparatus 130 further includes an encryption module, configured to: encrypt user data of the user terminal by using the first public key certificate, and store encrypted user data in a data platform, so the at least one computing unit decrypts and obtains the user data by using the first certificate pair.

Figure 14:
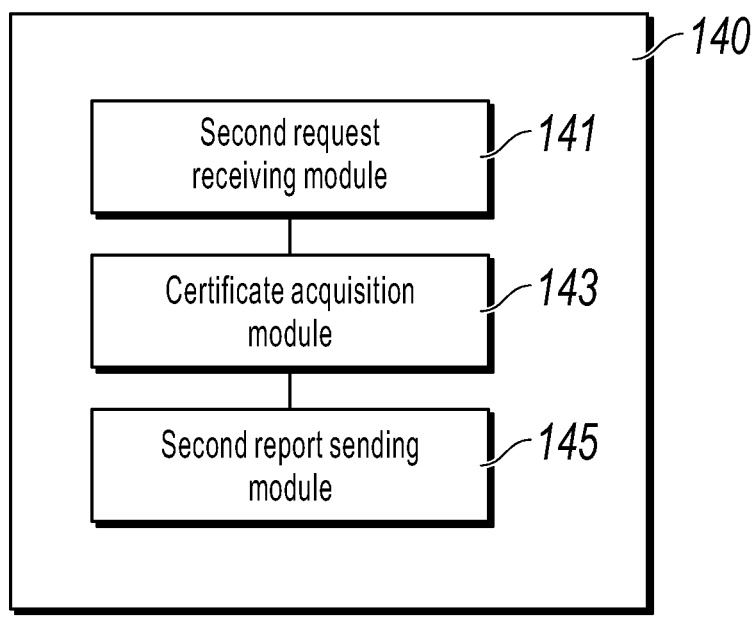
FIG. 14 is a schematic block diagram illustrating an apparatus for distributing a certificate to a user terminal in some implementations.

In some implementations according to another aspect, an apparatus for distributing a certificate to a user terminal is further provided and deployed on a trusted certificate generator. The trusted certificate generator can be implemented by any device, platform, or device cluster with computing and processing capabilities. FIG. 14 is a schematic block diagram illustrating an apparatus for distributing a certificate to a user terminal in some implementations. As shown in FIG. 14, the apparatus 140 includes: a second request receiving module 141, configured to receive a second certificate request sent by a user terminal, where the second certificate request includes a first group identifier of a first task group that the user terminal expects to connect; a certificate acquisition module 143, configured to obtain a first certificate chain and a first private key that are pre-generated for the first group identifier, where the first certificate chain includes a first root certificate and a first public key certificate corresponding to the first root certificate, the first public key certificate matches the first private key to form a first certificate pair, and at least the first certificate pair is pre-distributed to at least one computing unit that is authenticated and that runs each computing task in the first task group; and a second report sending module 145, configured to send a second certificate report to the user terminal, where the second certificate report includes at least the first root certificate, so the user terminal uses itself as a TLS client and uses the first root certificate as a trusted root certificate of the TLS client, so as to communicate with the at least one computing unit that has the first certificate pair and that functions as a TLS server.

According to some implementations, the apparatus 140 further includes an authentication information providing module (not shown). Before the second request receiving module 141 receives the second certificate request sent by the user terminal, the authentication information providing module provides second authentication information to the user terminal in response to an authentication request of the user terminal, so the user terminal performs authentication.

In some implementations, the authentication information providing module is configured to: generate a report file, where the report file includes a code hash and signature information of the trusted certificate generator; send the report file to a third-party authentication authority to obtain an authentication result file, where the authentication result file includes signature information of the third-party authentication authority; and provide the authentication result file as the second authentication information to the user terminal.

In some other implementations, the authentication information providing module is configured to: generate a report file, where the report file includes a code hash and signature information of the trusted certificate generator; and provide the report file as the second authentication information to the user terminal.

In some implementations, the second certificate report sent by the second report sending module 145 further includes a first hash list corresponding to the first group identifier, and the first hash list includes code hashes of all computing tasks belonging to the first task group.

In some implementations, the second certificate report sent by the second report sending module 145 further includes the first public key certificate, so the user terminal encrypts user data by using the first public key certificate.

Figure 15:
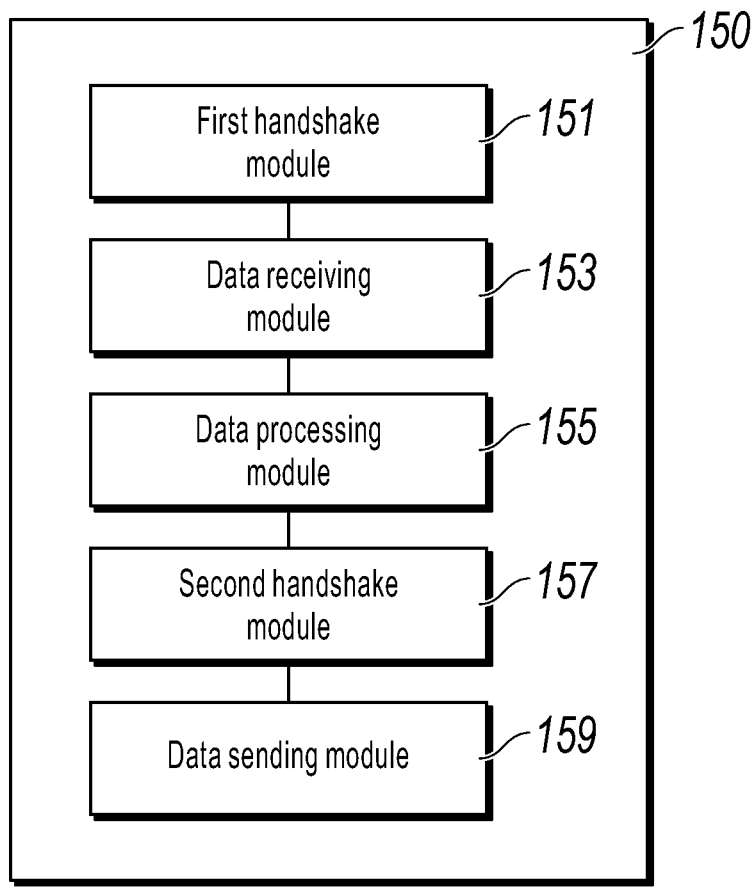
FIG. 15 is a schematic block diagram illustrating an apparatus for performing multi-parity computing, which is deployed on a first computing unit, in some implementations.

In some implementations according to another aspect, an apparatus for performing multi-party secure computing by using a digital certificate is provided, and the apparatus is deployed on a first computing unit running a first computing task. FIG. 15 is a schematic block diagram illustrating an apparatus for performing multi-parity computing, which is deployed on a first computing unit, in some implementations.

The first computing task is pre-configured to belong to a first task group, and the first task group further includes a second computing task run by a second computing unit; a first certificate pair and a first root certificate generated for the first task group are pre-distributed to the first computing unit, the first certificate pair includes a first public key certificate and a matched first private key, and the first public key certificate and the first root certificate form a first certificate chain; the first computing unit is configured as a first TLS server that provides a computing service of the first computing task, the first TLS server uses the first certificate pair as a certificate pair of the first TLS server, the first computing unit is further configured as a first TLS client at least connected to the second computing unit, and the first TLS client uses the first root certificate as a trusted root certificate of the first TLS client.

As shown in FIG. 15, the apparatus 150 includes: a first handshake module 151, configured to establish a first TLS trusted channel by using the first TLS server to make a TLS handshake with a user terminal that functions as a second TLS client, where the second TLS client uses the first root certificate as a trusted root certificate of the second TLS client; a data receiving module 153, configured to receive first user data by using the first TLS trusted channel; a data processing module 155, configured to perform first processing on the first user data to obtain first application data; a second handshake module 157, configured to establish a second TLS trusted channel by using the first TLS client to make a TLS handshake with a second computing unit that functions as a second TLS server, where the second TLS server uses the first certificate pair as a certificate pair of the second TLS server; and a data sending module 159, configured to transmit the first application data to the second computing unit by using the second TLS trusted channel.

In some implementations, the apparatus 150 further includes a data acquisition module (not shown), configured to read second user data from a data platform, where the second user data is generated by the user terminal through encryption by using the first public key certificate; and decrypt the second user data by using the first private key.

In some implementations, the apparatus 150 further includes a data encryption storage module (not shown), configured to generate second application data; encrypt the second application data by using the first public key certificate to obtain second encrypted application data; and store the second encrypted application data into a data platform, so the second computing unit decrypts and obtains the second application data by using the first certificate pair.

In some implementations according to another aspect, a computer readable storage medium is further provided, on which a computer program is stored. When the computer program is executed in a computer, the computer is caused to perform the method described with reference to FIG. 4, FIG. 8, and FIG. 10.

In some implementations according to still another aspect, a computing device is further provided and includes a memory and a processor. Executable code is stored in the memory, and when executing the executable code, the processor implements the method with reference to FIG. 4, FIG. 8, and FIG. 10.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for authentication, comprising:
   receiving, from a trusted computing unit included in a plurality of trusted computing units configured to perform a distributed computing process, a certificate request, wherein the certificate request comprises a group identifier of a group of computing tasks to be performed by the plurality of trusted computing units during the distributed computing process, authentication information, and a hash value of programming instructions associated with a computing task of the group of computing tasks;
   authenticating the trusted computing unit based on the authentication information;
   in response to authenticating the trusted computing unit, determining, based on the hash value, that that the computing task is included in the group of computing tasks;
   obtaining a certificate chain and a private key, wherein the private key is pre-generated for the group of computing tasks, wherein the certificate chain comprises a root certificate and a corresponding public key certificate, and wherein the corresponding public key certificate and the private key form a certificate pair; and sending a certificate report to the trusted computing unit, wherein the certificate report comprises the root certificate and the certificate pair.

2. The computer-implemented method of claim 1, wherein the certificate report enables the trusted computing unit to:
serve as a transport layer security (TLS) server for providing computing services to itself;
serve as a TLS client for external computing tasks;
set the certificate pair as a TLS server issued certificate pair; and
set the root certificate as a TLS client trusted root certificate.

3. The computer-implemented method of claim 1, wherein the authentication information comprises an authentication report signed by a third-party certification authority, and wherein authenticating the trusted computing unit is performed by verifying a signature included in the authentication report.

4. The computer-implemented method of claim 1, wherein the authentication information comprises a report generated by the trusted computing unit, wherein the report comprises the hash value and a digital signature of the trusted computing unit, and wherein authenticating the trusted computing unit comprises:
sending the report to a third-party certification authority;
receiving an authentication report signed by the third-party certification authority; and
determining that the trusted computing unit is authenticated based on the authenticated report signed by the third-party certification authority.

5. The computer-implemented method of claim 1, further comprising:
before receiving the certificate request, receiving a generation command from a configuration management device, wherein the generation command comprises the group identifier and a plurality of hash values of programming instructions corresponding to respective computing tasks of the group of computing tasks; and
generating the certificate chain and the private key.

6. The computer-implemented method of claim 1, wherein determining that the computing task is included in the group of computing tasks comprises:
obtaining a plurality of hash values of programming instructions corresponding to respective computing tasks of the group of computing tasks; and
determining that the hash value is included in the plurality of hash values.

7. The computer-implemented method of claim 1, wherein the root certificate comprises a public key and a signature of a trusted certificate generator, and wherein the public key is usable to verify the signature.

8. The computer-implemented method of claim 1, further comprising:
before receiving the certificate request, performing key negotiation with the trusted computing unit to generate additional encryption keys for establishing a trusted communication channel.

9. A computer-implemented system for authentication, comprising
one or more computers, and
one or more computer memory devices interoperably coupled with the one or more computers and having tangible, non-transitory, machine-readable media storing one or more instructions that, when executed by the one or more computers, cause the one or more computers to perform one or more operations comprising:
receiving, from a trusted computing unit included in a plurality of trusted computing units configured to perform a distributed computing process, a certificate request, wherein the certificate request comprises a group identifier of a group of computing tasks to be performed by the plurality of trusted computing units during the distributed computing process, authentication information, and a hash value of programming instructions associated with a computing task of the group of computing tasks;
authenticating the trusted computing unit based on the authentication information;
in response to authenticating the trusted computing unit, determining, based on the hash value, that that the computing task is included in the group of computing tasks;
obtaining a certificate chain and a private key, wherein the private key is pre-generated for the group of computing tasks, wherein the certificate chain comprises a root certificate and a corresponding public key certificate, and wherein the corresponding public key certificate and the private key form a certificate pair; and
sending a certificate report to the trusted computing unit, wherein the certificate report comprises the root certificate and the certificate pair.

10. The computer-implemented system of claim 9, wherein the certificate report enables the trusted computing unit to:
serve as a transport layer security (TLS) server for providing computing services to itself;
serve as a TLS client for external computing tasks;
set the certificate pair as a TLS server issued certificate pair; and
set the root certificate as a TLS client trusted root certificate.

11. The computer-implemented system of claim 9, wherein the authentication information comprises an authentication report signed by a third-party certification authority, and wherein authenticating the trusted computing unit is performed by verifying a signature included in the authentication report.

12. The computer-implemented system of claim 9, wherein the authentication information comprises a report generated by the trusted computing unit, wherein the report comprises the hash value and a digital signature of the trusted computing unit, and wherein authenticating the trusted computing unit comprises:
sending the report to a third-party certification authority;
receiving an authentication report signed by the third-party certification authority; and determining that the trusted computing unit is authenticated based on the authenticated report signed by the third-party certification authority.

13. The computer-implemented system of claim 9, the operations further comprising:
before receiving the certificate request, receiving a generation command from a configuration management device, wherein the generation command comprises the group identifier and a plurality of hash values of programming instructions corresponding to respective computing tasks of the group of computing tasks; and
generating the certificate chain and the private key.

14. The computer-implemented system of claim 9, wherein determining that the computing task is included in the group of computing tasks comprises:

obtaining a plurality of hash values of programming instructions corresponding to respective computing tasks of the group of computing tasks; and determining that the hash value is included in the plurality of hash values.

15. The computer-implemented system of claim 9, wherein the root certificate comprises a public key and a signature of a trusted certificate generator, and wherein the public key is usable to verify the signature.

16. The computer-implemented system of claim 9, the operations further comprising:

before receiving the certificate request, performing key negotiation with the trusted computing unit to generate additional encryption keys for establishing a trusted communication channel.

17. A non-transitory, computer-readable medium storing one or more instructions that, when executed by a computer system, cause the computer system to perform one or more operations for authentication, the operations comprising:

receiving, from a trusted computing unit included in a plurality of trusted computing units configured to perform a distributed computing process, a certificate request, wherein the certificate request comprises a group identifier of a group of computing tasks to be performed by the plurality of trusted computing units during the distributed computing process, authentication information, and a hash value of programming instructions associated with a computing task of the group of computing tasks;

authenticating the trusted computing unit based on the authentication information;

in response to authenticating the trusted computing unit, determining, based on the hash value, that that the computing task is included in the group of computing tasks;

obtaining a certificate chain and a private key, wherein the private key is pre-generated for the group of computing tasks, wherein the certificate chain comprises a root certificate and a corresponding public key certificate, and wherein the corresponding public key certificate and the private key form a certificate pair; and sending a certificate report to the trusted computing unit, wherein the certificate report comprises the root certificate and the certificate pair.

18. The non-transitory, computer-readable medium of claim 17, wherein the certificate report enables the trusted computing unit to:

serve as a transport layer security (TLS) server for providing computing services to itself;

serve as a TLS client for external computing tasks;

set the certificate pair as a TLS server issued certificate pair; and set the root certificate as a TLS client trusted root certificate.

19. The non-transitory, computer-readable medium of claim 17, wherein the authentication information comprises an authentication report signed by a third-party certification authority, and wherein authenticating the trusted computing unit is performed by verifying a signature included in the authentication report.

20. The non-transitory, computer-readable medium of claim 17, wherein the authentication information comprises a report generated by the trusted computing unit, wherein the report comprises the hash value and a digital signature of the trusted computing unit, and wherein authenticating the trusted computing unit comprises:

sending the report to a third-party certification authority;

receiving an authentication report signed by the third-party certification authority; and determining that the trusted computing unit is authenticated based on the authenticated report signed by the third-party certification authority.

21. The non-transitory, computer-readable medium of claim 17, the operations further comprising:

before receiving the certificate request, receiving a generation command from a configuration management device, wherein the generation command comprises the group identifier and a plurality of hash values of programming instructions corresponding to respective computing tasks of the group of computing tasks; and generating the certificate chain and the private key.

22. The non-transitory, computer-readable medium of claim 17, wherein determining that the computing task is included in the group of computing tasks comprises:

obtaining a plurality of hash values of programming instructions corresponding to respective computing tasks of the group of computing tasks; and determining that the hash value is included in the plurality of hash values.

23. The non-transitory, computer-readable medium of claim 17, wherein the root certificate comprises a public key and a signature of a trusted certificate generator, and wherein the public key is usable to verify the signature.

24. The non-transitory, computer-readable medium of claim 17, the operations further comprising:

before receiving the certificate request, performing key negotiation with the trusted computing unit to generate additional encryption keys for establishing a trusted communication channel.

* * * * *